(12) United States Patent
Wu

(10) Patent No.: US 11,442,196 B2
(45) Date of Patent: *Sep. 13, 2022

(54) SYSTEMS AND METHODS TO CALIBRATE INDIVIDUAL COMPONENT MEASUREMENT

(71) Applicant: Halliburton Energy Services, Inc., Houston, TX (US)

(72) Inventor: Hsu-Hsiang Wu, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 603 days.

This patent is subject to a terminal disclaimer.

(21) Appl. No.: 15/767,501

(22) PCT Filed: Dec. 18, 2015

(86) PCT No.: PCT/US2015/066752
§ 371 (c)(1),
(2) Date: Apr. 11, 2018

(87) PCT Pub. No.: WO2017/105500
PCT Pub. Date: Jun. 22, 2017

(65) Prior Publication Data
US 2018/0292572 A1    Oct. 11, 2018

(51) Int. Cl.
*G01V 13/00* (2006.01)
*G01V 3/26* (2006.01)
*E21B 47/0228* (2012.01)

(52) U.S. Cl.
CPC ............... *G01V 13/00* (2013.01); *G01V 3/26* (2013.01); *E21B 47/0228* (2020.05)

(58) Field of Classification Search
CPC ....... G01V 13/00; G01V 3/26; E21B 47/0228
See application file for complete search history.

(56) References Cited

U.S. PATENT DOCUMENTS

| | | | |
|---|---|---|---|
| 4,072,200 A | 2/1978 | Morris et al. |
| 4,372,398 A | 2/1983 | Kuckes |
| 4,443,762 A | 4/1984 | Kuckes |
| 4,700,142 A | 10/1987 | Kuckes |
| 4,763,520 A | 8/1988 | Titchener et al. |
| 4,933,640 A | 6/1990 | Kuckes |

(Continued)

FOREIGN PATENT DOCUMENTS

| | | |
|---|---|---|
| WO | 2007015087 A1 | 2/2007 |
| WO | 2008076130 A1 | 6/2008 |

(Continued)

OTHER PUBLICATIONS

CA Application Serial No. 3,001,300; Office Action; dated Jan. 9, 2020, 3 pages.

(Continued)

*Primary Examiner* — Douglas Kay
(74) *Attorney, Agent, or Firm* — DeLizio, Peacock, Lewin & Guerra

(57) ABSTRACT

Apparatus and procedures that provide calibration for measurement tools can be implemented in a number of applications. Tool constant matrices generated in such calibration procedures can be utilized in downhole ranging measurements. Additional apparatus, systems, and methods are can be used in a variety of applications.

17 Claims, 16 Drawing Sheets

(56) References Cited

U.S. PATENT DOCUMENTS

| | | | |
|---|---|---|---|
| 5,065,100 A | 11/1991 | Vail, III | |
| 5,084,678 A | 1/1992 | Hutin | |
| 5,189,415 A | 2/1993 | Shimada et al. | |
| 5,230,387 A | 7/1993 | Waters et al. | |
| 5,258,755 A | 11/1993 | Kuckes | |
| 5,305,212 A | 4/1994 | Kuckes | |
| 5,485,089 A | 1/1996 | Kuckes | |
| 5,512,830 A | 4/1996 | Kuckes | |
| 5,582,248 A | 12/1996 | Estes | |
| 5,589,775 A | 12/1996 | Kuckes | |
| 5,923,170 A | 7/1999 | Kuckes | |
| 6,179,066 B1 | 1/2001 | Nasr et al. | |
| 6,525,540 B1 | 2/2003 | Kong et al. | |
| 6,543,146 B2* | 4/2003 | Smith | G01C 17/38 33/356 |
| 6,985,814 B2 | 1/2006 | McElhinney | |
| 7,268,552 B1 | 9/2007 | Gerald, II et al. | |
| 7,703,548 B2 | 4/2010 | Clark | |
| 7,719,282 B2 | 5/2010 | Fanini et al. | |
| 7,866,386 B2 | 1/2011 | Beer et al. | |
| 7,962,287 B2 | 6/2011 | Clark | |
| 7,969,819 B2 | 6/2011 | Hall et al. | |
| 8,011,451 B2 | 9/2011 | Macdonald | |
| 8,126,650 B2 | 2/2012 | Lu et al. | |
| 8,237,443 B2 | 8/2012 | Hopmann et al. | |
| 8,324,912 B2 | 12/2012 | Waid | |
| 8,462,012 B2 | 6/2013 | Clark et al. | |
| 8,680,866 B2 | 3/2014 | Marsala et al. | |
| 8,749,243 B2 | 6/2014 | Bittar et al. | |
| 8,837,653 B2* | 9/2014 | Keegan | H04B 1/123 375/350 |
| 8,844,648 B2 | 9/2014 | Bittar et al. | |
| 9,404,354 B2 | 8/2016 | Sugiura | |
| 9,581,718 B2 | 2/2017 | Rodney | |
| 9,702,240 B2 | 7/2017 | Bittar et al. | |
| 10,119,389 B2* | 11/2018 | Donderici | E21B 47/02 |
| 10,132,157 B2* | 11/2018 | Kuckes | E21B 43/2406 |
| 2002/0000808 A1 | 1/2002 | Nichols | |
| 2002/0100178 A1* | 8/2002 | Smith | G01C 17/38 33/356 |
| 2003/0137297 A1 | 7/2003 | Ganesan | |
| 2004/0163443 A1 | 8/2004 | McElhinney | |
| 2005/0218898 A1 | 10/2005 | Fredette et al. | |
| 2006/0113112 A1 | 6/2006 | Waters | |
| 2006/0131013 A1 | 6/2006 | McElhinney | |
| 2007/0126426 A1 | 6/2007 | Clark et al. | |
| 2007/0187089 A1 | 8/2007 | Bridges | |
| 2008/0000686 A1 | 1/2008 | Kuckes et al. | |
| 2008/0177475 A1 | 7/2008 | McElhinney et al. | |
| 2008/0275648 A1 | 11/2008 | Illfelder | |
| 2009/0030615 A1 | 1/2009 | Clark | |
| 2009/0120691 A1 | 5/2009 | Waters et al. | |
| 2009/0164127 A1 | 6/2009 | Clark | |
| 2009/0178850 A1 | 7/2009 | Waters et al. | |
| 2009/0260878 A1 | 10/2009 | Morley et al. | |
| 2009/0308657 A1 | 12/2009 | Clark et al. | |
| 2010/0194395 A1 | 8/2010 | McElhinney | |
| 2010/0300756 A1 | 12/2010 | Bergstrom et al. | |
| 2010/0332137 A1 | 12/2010 | Meadows et al. | |
| 2011/0015862 A1 | 1/2011 | Sato et al. | |
| 2011/0018542 A1 | 1/2011 | Clark et al. | |
| 2011/0088890 A1 | 4/2011 | Clark | |
| 2011/0284731 A1 | 11/2011 | Roscoe et al. | |
| 2011/0290011 A1 | 12/2011 | Dowla et al. | |
| 2011/0298462 A1 | 12/2011 | Clark et al. | |
| 2011/0308794 A1 | 12/2011 | Bittar et al. | |
| 2011/0308859 A1 | 12/2011 | Bittar et al. | |
| 2011/0309836 A1 | 12/2011 | Bittar et al. | |
| 2012/0001637 A1 | 1/2012 | Bittar et al. | |
| 2012/0013339 A1 | 1/2012 | Kuckes et al. | |
| 2012/0109527 A1 | 5/2012 | Bespalov et al. | |
| 2012/0139543 A1 | 6/2012 | McElhinney et al. | |
| 2012/0158305 A1 | 6/2012 | Rodney et al. | |
| 2012/0257475 A1 | 10/2012 | Luscombe et al. | |
| 2012/0273192 A1 | 11/2012 | Schmidt et al. | |
| 2012/0283951 A1 | 11/2012 | Li et al. | |
| 2012/0283952 A1 | 11/2012 | Tang et al. | |
| 2013/0056272 A1 | 3/2013 | Kuckes | |
| 2013/0068526 A1 | 3/2013 | Snyder et al. | |
| 2013/0069655 A1 | 3/2013 | McElhinney et al. | |
| 2013/0075084 A1 | 3/2013 | Clark et al. | |
| 2013/0151158 A1 | 6/2013 | Brooks et al. | |
| 2013/0173164 A1 | 7/2013 | Zhang | |
| 2013/0184995 A1 | 7/2013 | Sinclair et al. | |
| 2013/0329841 A1* | 12/2013 | Keegan | G01S 19/36 375/350 |
| 2013/0333946 A1 | 12/2013 | Sugiura | |
| 2014/0132272 A1 | 5/2014 | Cuevas et al. | |
| 2014/0145857 A1 | 5/2014 | Comparetto | |
| 2014/0191120 A1 | 7/2014 | Donderici et al. | |
| 2014/0374159 A1 | 12/2014 | McElhinney et al. | |
| 2015/0013968 A1 | 1/2015 | Hsu et al. | |
| 2015/0027779 A1 | 1/2015 | Sugiura et al. | |
| 2015/0032375 A1 | 1/2015 | Bertrand et al. | |
| 2015/0124562 A1 | 5/2015 | Yoneshima et al. | |
| 2015/0240623 A1 | 8/2015 | Blangé et al. | |
| 2015/0308260 A1* | 10/2015 | Kuckes | E21B 43/305 175/45 |
| 2015/0323568 A1* | 11/2015 | Schmitt | G01R 1/0408 324/126 |
| 2015/0361789 A1 | 12/2015 | Donderici et al. | |
| 2015/0378044 A1 | 12/2015 | Brooks | |
| 2016/0216396 A1 | 7/2016 | Golla et al. | |
| 2016/0258275 A1 | 9/2016 | Wu et al. | |
| 2016/0258276 A1 | 9/2016 | Donderici et al. | |
| 2016/0265343 A1* | 9/2016 | Donderici | E21B 43/305 |
| 2016/0273338 A1 | 9/2016 | Wu | |
| 2016/0273339 A1 | 9/2016 | Wu | |
| 2016/0273340 A1 | 9/2016 | Roberson et al. | |
| 2016/0273341 A1 | 9/2016 | Wu et al. | |
| 2016/0273342 A1 | 9/2016 | Wu et al. | |
| 2016/0273343 A1 | 9/2016 | Donderici et al. | |
| 2016/0273344 A1 | 9/2016 | Wu et al. | |

FOREIGN PATENT DOCUMENTS

| | | | |
|---|---|---|---|
| WO | 2012134468 A1 | 10/2012 | |
| WO | 2013162505 A1 | 10/2013 | |
| WO | 2014089402 A2 | 6/2014 | |
| WO | 2014089490 A1 | 6/2014 | |
| WO | WO-2015099790 A1 * | 7/2015 | E21B 47/0228 |
| WO | 2016025230 A1 | 2/2016 | |
| WO | 2016025232 A1 | 2/2016 | |
| WO | 2016025235 A1 | 2/2016 | |
| WO | 2016025237 A1 | 2/2016 | |
| WO | 2016025238 A1 | 2/2016 | |
| WO | 2016025241 A1 | 2/2016 | |
| WO | 2016025245 A1 | 2/2016 | |
| WO | 2016025247 A1 | 2/2016 | |

OTHER PUBLICATIONS

"International Application Serial No. PCT/US2015/066752, International Search Report dated Aug. 24, 2016", 3 pgs.

"International Application Serial No. PCT/US2015/066752, International Written Opinion dated Aug. 24, 2016", 14 pgs.

EP Application Serial No. 15910961.0; Extended European Search Report; dated Jul. 17, 2019, 6 pages.

CA Application Serial No. 3,001,300, Office Action, dated Feb. 1, 2019, 4 pages.

Definition of well head accessed through Schlumberger Oilfield Glossary on Nov. 15, 2016 via http://www.glossary.oilfield.slb.com/Terms/w/wellhead.aspx, 1 pages.

Definition of cement accessed through Schlumberger Oilfield Glossary on Nov. 15, 2016 via http://www.glossary.oilfield.slb.com/Terms/c/cement.aspx, 2 pages.

Van Dongen, "A Directional Borehole Radar System for Subsurface Imaging", DUP Science, Jan. 1, 2002, 111 pgs.

* cited by examiner

Sensor 1

Sensor 2

Sensor 3

Sensor 4

SYSTEMS AND METHODS TO CALIBRATE INDIVIDUAL COMPONENT MEASUREMENT

TECHNICAL FIELD

The present invention relates generally to apparatus and methods related to measurements and measurement tools.

BACKGROUND

With much of the world's easily obtainable oil having already been produced, new techniques are being developed to extract less accessible hydrocarbons. These techniques often involve drilling a borehole in close proximity to one or more existing wells. Examples of directed drilling near an existing well include well intersection for blowout control, multiple wells drilled from an offshore platform, and closely spaced wells for geothermal energy recovery. Another such technique is steam-assisted gravity drainage (SAGD) that uses a pair of vertically-spaced, horizontal wells constructed along a substantially parallel path, often less than ten meters apart. Careful control of the spacing contributes to the effectiveness of the SAGD technique.

One way to construct a borehole in close proximity to an existing well is "active ranging" or "access-dependent ranging" in which an electromagnetic source is located in the existing well and monitored via sensors on the drill string in the well under construction. Another technique involves systems that locate both the source and the sensor(s) on the drill string—relying on backscatter transmission from the target well to determine the range between the drilling well and the target well. These latter systems are sometimes called "passive ranging" or "access-independent" systems by those of ordinary skill in the art. In either case, the ranging techniques are sometimes limited in the degree of accuracy that can be obtained.

Current calibrations of a gradient tool have several issues associated with the calibration and subsequent use of the tool. For example, current calibration procedures include the utilization of all components to calculate a tool calibration coefficient. An individual component herein refers to a tangential component, a normal component, or a tool axial component related to a tool mandrel. A related ranging calculation will incur singularity issues, if some of the components used in the calculation have a blind spot at certain tool orientation related to a target well. This prevents a ranging tool from being operated at any angle range to a target well, and it can require a significant number of sensors installed in the ranging tool in order to avoid blind spots and achieve good calibrated results.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, methods to precisely calibrate individual component measurement of a gradient tool can be implemented. Such methods can provide calibration enhancements relative to the calibration methods currently used. The calibration enhancements include implementing calibration methods based on any individual component measurement of a gradient tool. Consequently, the calibration and ranging distance determination can be performed using only normal component, only tangential component, or any combination of all available measurements of the gradient tool as long as the used measurements are sensitive enough to the target well signal. Such techniques provide improvements to measurement over other procedures such as for example the procedure discussed in international patent publication WO2014089490 that uses all components to achieve calibration methods, which does not calculate ranging distance based on a particular individual component, such as calculation using only normal component. Other known techniques include a ranging calculation based on only tangential component, only normal component, or all components, if no calibration is needed, that is, such techniques assume perfect measurements for each component.

Figure 1:
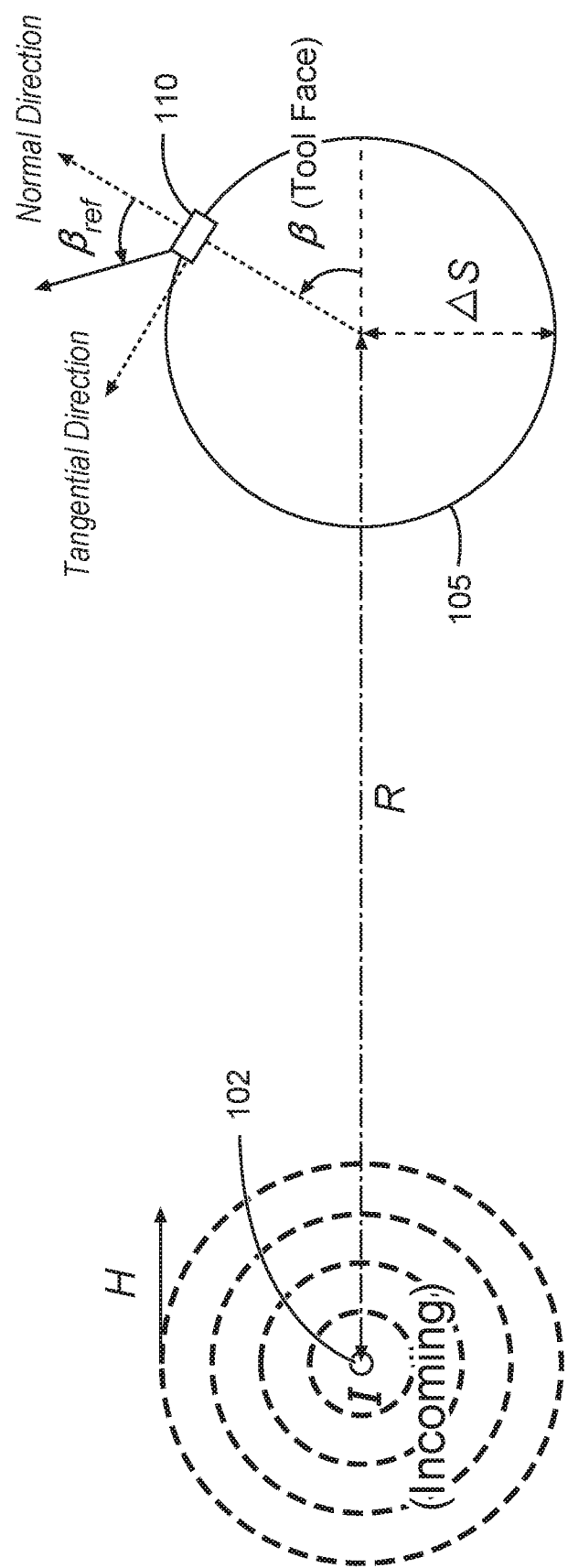
FIG. 1 is a sketch of an arrangement of a line source and a ranging tool having a sensor, in accordance with various embodiments.
Figure 2A:
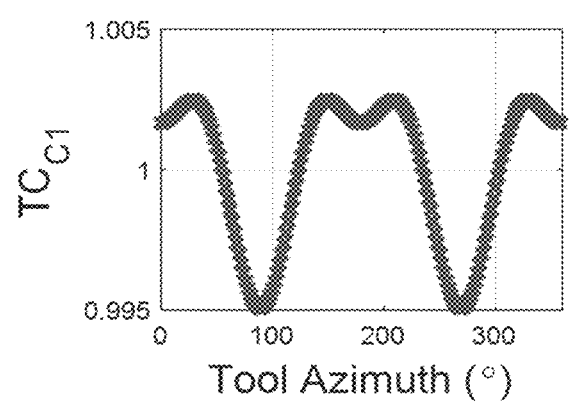
FIGS. 2A-2D is an example representation of tool constant matrix libraries versus different tool azimuthal angles from using a four-angle measurement technique, in accordance with various embodiments.
Figure 2B:
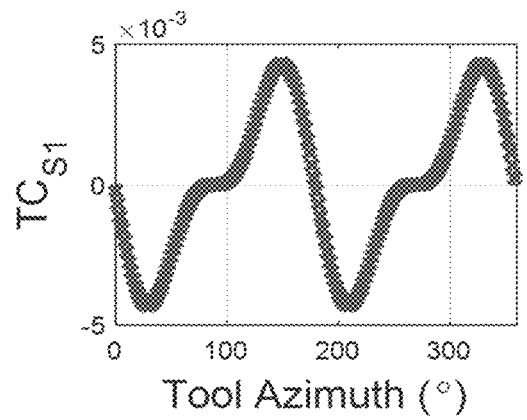
Figure 2C:
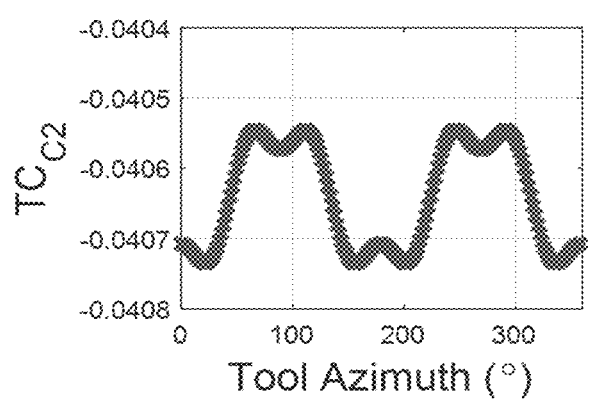
Figure 2D:
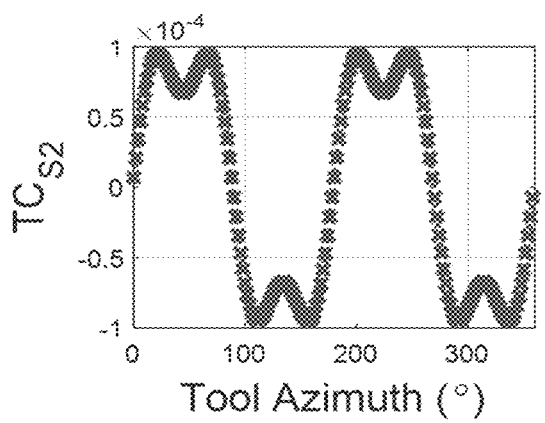
Figure 3A:
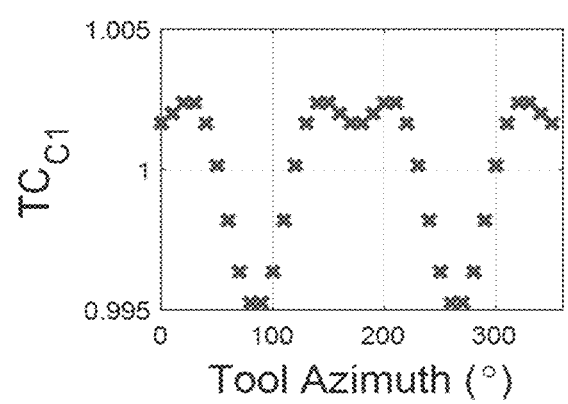
FIGS. 3A-3D are plots of calibration coefficients for tool constant matrix libraries with respect to different tool azimuth to the excitation source, in accordance with various embodiments.
Figure 3B:
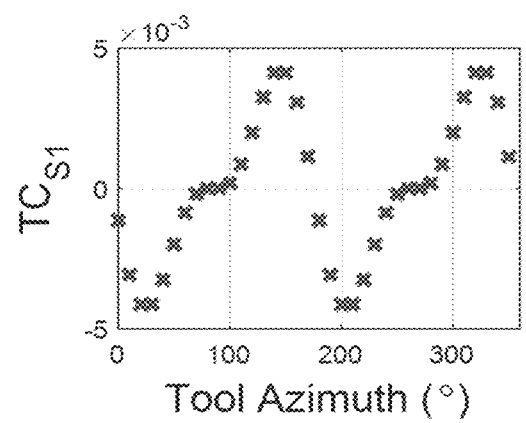
Figure 3C:
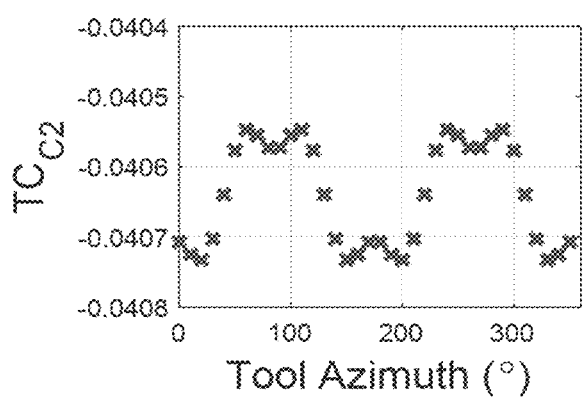
Figure 3D:
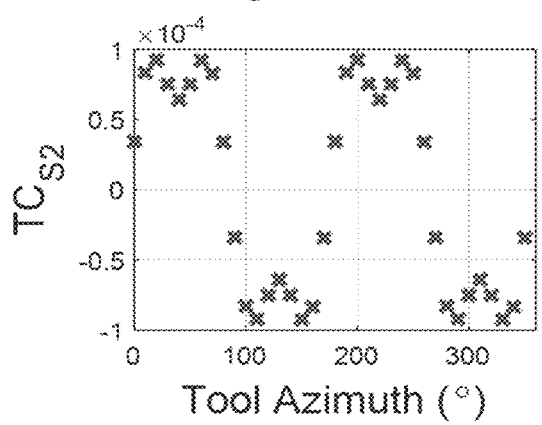

FIG. 1 is a sketch of an arrangement of a line source 102 and a ranging tool 105 having a sensor MI In this representation, the ranging tool 105 is parallel to the line source 102 that carries current of amplitude I, where R is distance from the ranging tool center to the line source 102. Assuming the sensor 110 has an offset angle $\beta$, which is known as a tool face angle, with respect to a direction to the line source 102 and the sensor 110 is orientated at an angle $\beta_{ref}$ with respect to the tool face angle direction, then the sensor measurement $M_{Sensor}$ at the particular tool face angle $\beta$ can be approximately expressed as $$M_{Sensor}(\beta) = H\cos(\beta+\beta_{ref}) + H\sin(\beta+\beta_{ref}) + GH\cos(2(\beta+\beta_{ref})) + GH\sin(2(\beta+\beta_{ref})) \quad (1)$$

where, $$H = \frac{I}{2\pi R}, \quad GH = \frac{I}{2\pi R^2}$$

By taking sensor misalignment and defects into consideration, equation (1) can be modified as $$\begin{aligned}M_{Sensor}(\beta) &= TC_{c1} \times H\cos(\beta+\beta_{ref}) + TC_{s1} \times H\sin(\beta+\beta_{ref}) + \\ & \quad TC_{c2} \times GH\cos(2(\beta+\beta_{ref})) + TC_{s2} \times GH\sin(2(\beta+\beta_{ref})) \\ &= [\,H\cos(\beta+\beta_{ref}) \quad H\sin(\beta+\beta_{ref}) \quad GH\cos(2(\beta+\beta_{ref})) \quad GH\sin(2(\beta+\beta_{ref}))\,] \times \\ & \quad \begin{bmatrix} TC_{c1} \\ TC_{s1} \\ TC_{c2} \\ TC_{s2} \end{bmatrix} \\ &= \text{Design Matrix} \times \text{Tool Constant Matrix}\end{aligned} \quad (2)$$

Equation (2) utilizes the tool constant matrix to determine effect of the sensor misalignment and any defects on the measurements, whereas the design matrix is based on equation (1) assuming perfect sensor measurement. In a conventional approach, equation (2) would be addressed by including all measurements of a gradient sensor to decouple the tool constant matrix. If some of the measurements used in the calculation are very insensitive to the line source (for example, when sensor orientation is located at or close to a blind spot), corresponding ranging calculation may fail to determine the true ranging distance to the source. In addition, in the conventional approach, only one set of the tool constant matrix will be obtained for all sensors and used for ranging calculation.

Similar to existing calibration methods, the current I and the distance R in FIG. 1 must be known in order to decouple the tool constant matrix. That is, the design matrix in equation (2) is known. Since there are four unknown coefficients in the tool constant matrix, sensor measurements with respect to at least four different tool face angles are required to decouple the tool constant matrix. In various embodiments, equation (3A) can be implemented, where equation (3A) is based on four tool azimuth angles measurements, expressed as where for calibration, equation (3A) can be viewed as Lab Measurements=Design Matrix×Tool Constant Matrix (3B)

In equation (3A), the design matrix is calculated and known based on the known current I and the known distance R in FIG. 1, and the lab measurements are taken at four different reference angles (tool face) in FIG. 1. Consequently, the tool constant matrix for one particular sensor can be decoupled using equation (3A). To avoid the blind spot issue, one must ensure a particular component at the four chosen angles has sensitivity to the excitation source. For example, if a sensor is orientated in the tangential direction of FIG. 1, the corresponding sensor measurements have blind spots when tool face $\beta$ equals (or is close to) 90° and 270°. In addition, in order to determine a good calibration tool constant, particular for gradient field calibrations ($TC_{c2}$ and $TC_{s2}$), one should include the measurements at the angles with the strongest fields. For this tangential component, it is better to include measurements at tool face $\beta$ equals (or is close to) 0° and 180° such that the calibration coefficients can be accurately determined.

However, instead of calculating only one tool constant matrix, one actually can build a tool constant matrix library for different tool face angles to precisely calibrate tool measurements, since measurements at only four angles are required to determine four unknown components of the tool constant matrix in equation (2). For example, consider a sensor oriented in the tangential direction. The sensor can be used to take azimuthal measurements with different tool face angles $\beta$ from 0° to 360° relative to the line source, with the sensor operated to take one measurement at every 2° increment. For this sensor, one can choose four angles from all azimuth measurements to generate one tool constant matrix for one particular angle. For example, one can use measurements at the tool face angle $\beta$ at 0°, 2°, 180°, and 182° to calculate a tool constant matrix and define the tool constant matrix as calibration coefficients when tool face angle $\beta$ is 0° in practice. Similarly, measurements at the tool face angle $\beta$ at 40°, 42°, 220°, and 222° can be used to calculate a tool constant matrix and then assign the calculated calibration coefficients for tool face angle $\beta$ being 40° in practice.

$$\begin{bmatrix} M_{Sensor}(\beta_1) \\ M_{Sensor}(\beta_2) \\ M_{Sensor}(\beta_3) \\ M_{Sensor}(\beta_4) \end{bmatrix} = \begin{bmatrix} H\cos(\beta_1+\beta_{ref}) & H\sin(\beta_1+\beta_{ref}) & GH\cos(2(\beta_1+\beta_{ref})) & GH\sin(2(\beta_1+\beta_{ref})) \\ H\cos(\beta_2+\beta_{ref}) & H\sin(\beta_2+\beta_{ref}) & GH\cos(2(\beta_2+\beta_{ref})) & GH\sin(2(\beta_2+\beta_{ref})) \\ H\cos(\beta_3+\beta_{ref}) & H\sin(\beta_3+\beta_{ref}) & GH\cos(2(\beta_3+\beta_{ref})) & GH\sin(2(\beta_3+\beta_{ref})) \\ H\cos(\beta_4+\beta_{ref}) & H\sin(\beta_4+\beta_{ref}) & GH\cos(2(\beta_4+\beta_{ref})) & GH\sin(2(\beta_4+\beta_{ref})) \end{bmatrix} \times \begin{bmatrix} TC_{c1} \\ TC_{s1} \\ TC_{c2} \\ TC_{s2} \end{bmatrix} \quad (3A)$$

FIGS. 2A-2D present tool constant matrix libraries versus different tool azimuthal angles using the four-angle measurement technique described above. FIGS. 2A-2D are plots of calibration coefficients for tool constant matrix libraries with respect to different tool azimuth to the excitation source. Lab measurements at $\beta_i$, $\beta_i+2°$, $\beta_i+180°$, $\beta_i+182°$ are used to calculate tool constant matrix for tool azimuth of $\beta_i$.

However, the measurements can be chosen from four other angles, such as tool face angle $\beta$ at $\beta_i$, $\beta_i+10°$, $\beta_i+180°$, and $\beta_i+190°$, to calculate the tool constant matrix for tool face angle $\beta_i$ in practice. FIGS. 3A-3D are plots of calibration coefficients for tool constant matrix libraries with respect to different tool azimuth to the excitation source. Lab measurements at $\beta_i$, $\beta_i+10°$, $\beta_i+180°$, $\beta_i+190°$ are used to calculate tool constant matrix for tool azimuth of $\beta_i$. FIGS. 3A-3D present the tool constant matrix library using the 10° increment as calculation.

Figure 4:
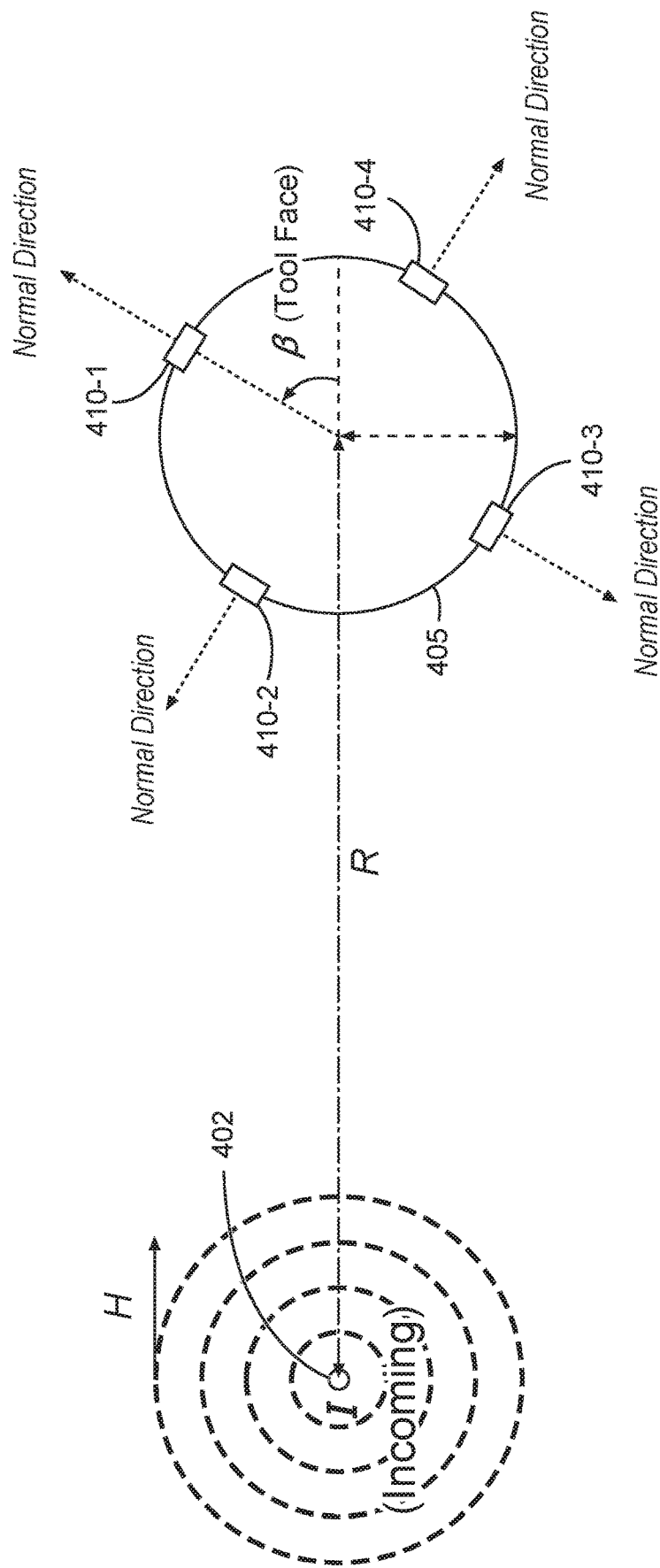
FIG. 4 is a sketch of a line source and an example ranging tool equipped with four normal component sensors, in accordance with various embodiments.

Modeling responses can be used as validations to verify the calibration techniques taught herein. FIG. 4 is a sketch of a line source 402 and a ranging tool 405 equipped with four normal component sensors, 410-1, 410-2, 410-3, and 410-4. The four sensors are 90° azimuthally separated from each other, and the sensor direction of sensor 410-1 is also indicated as the tool face direction. The line source 402 and the ranging tool 405 are separated by a distance R between the centers of the two structures.

Figure 5A:
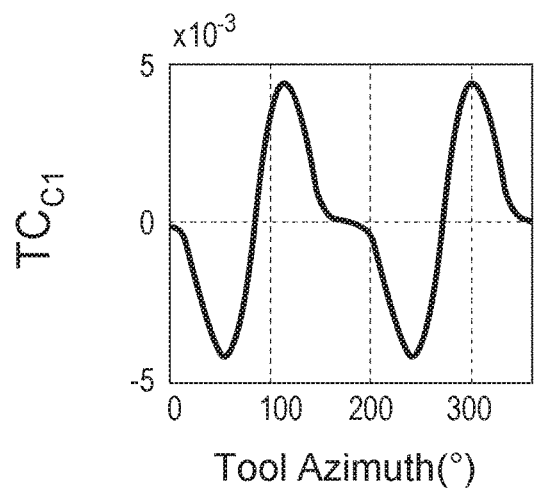
FIGS. 5A-5P are plots of calibration coefficients for tool constant matrix libraries with respect to different tool azimuth to the excitation source of FIG. 4, in accordance with various embodiments.
Figure 5B:
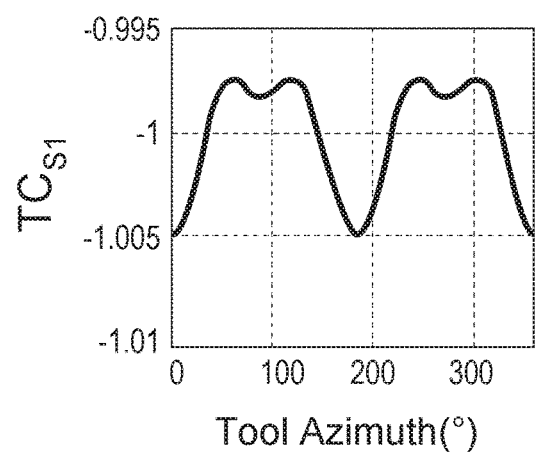
Figure 5C:
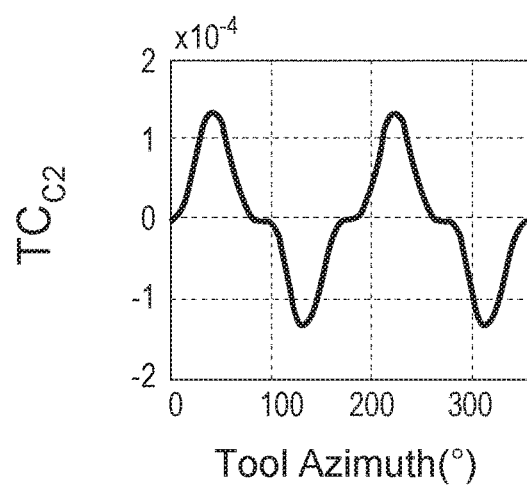
Figure 5D:
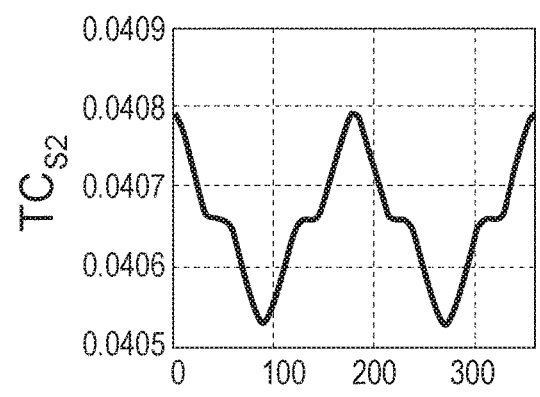
Figure 5E:
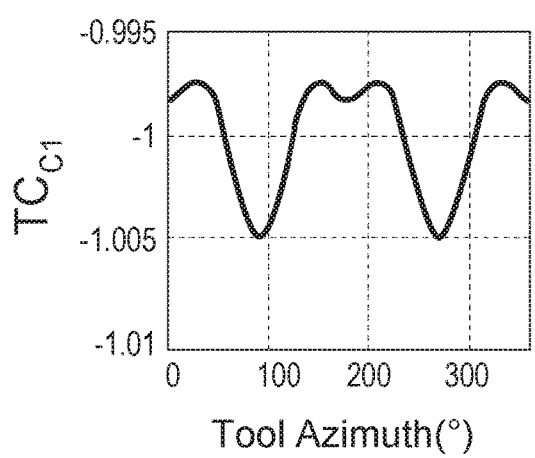
Figure 5F:
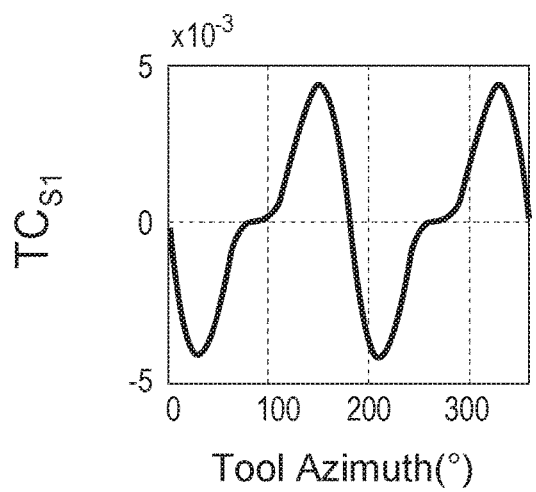
Figure 5G:
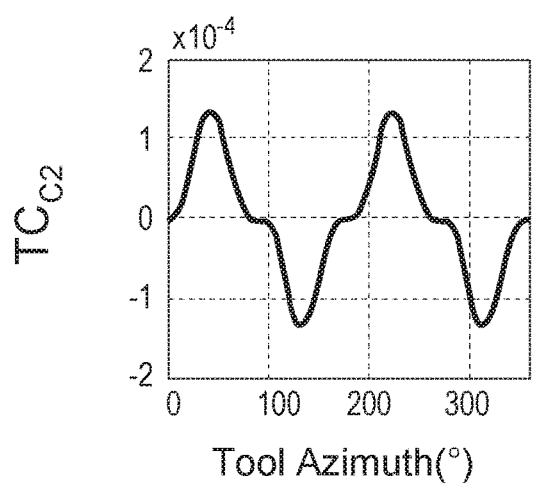
Figure 5H:
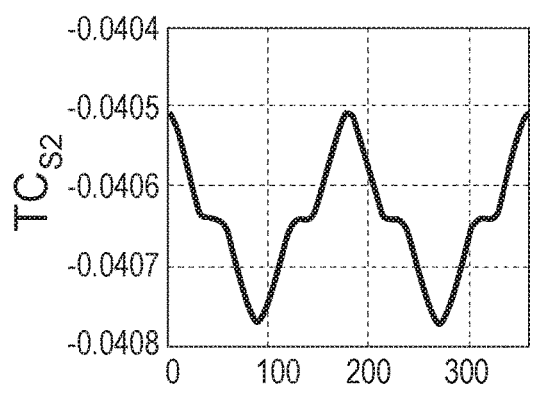
Figure 5I:
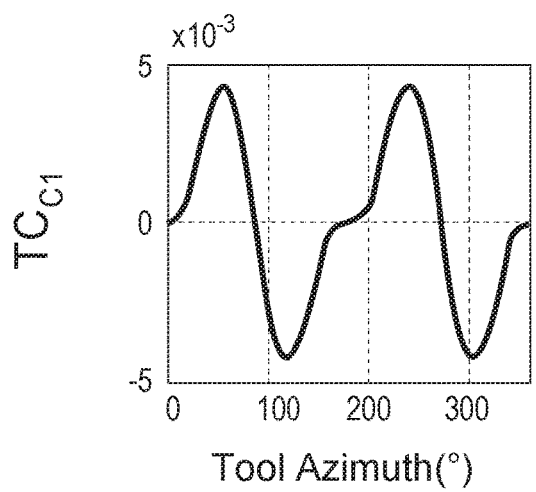
Figure 5J:
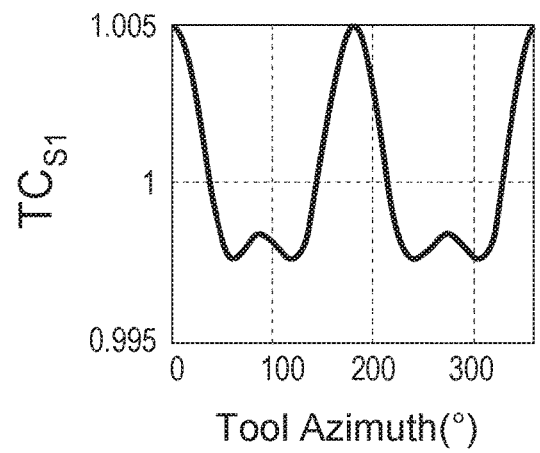
Figure 5K:
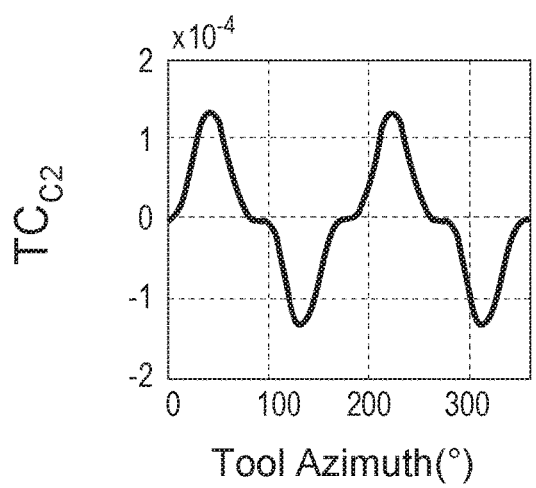
Figure 5L:
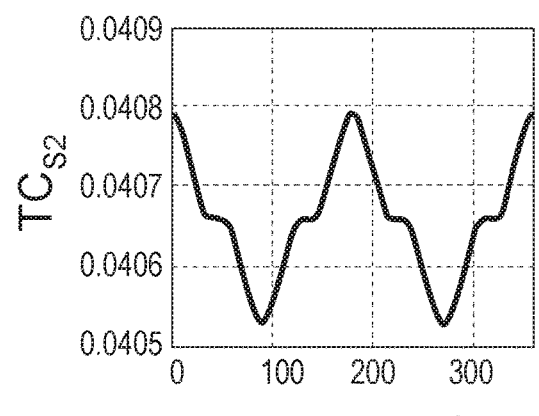
Figure 5M:
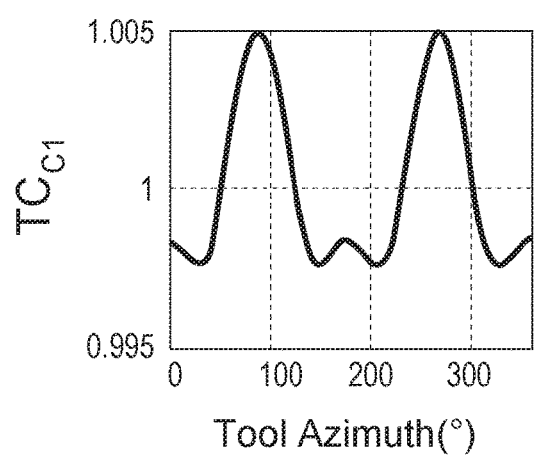
Figure 5N:
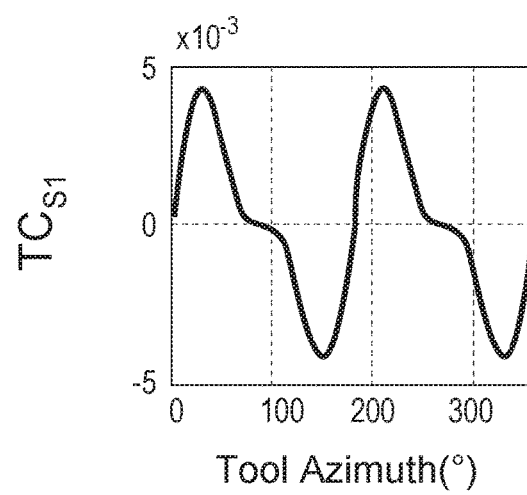
Figure 5O:
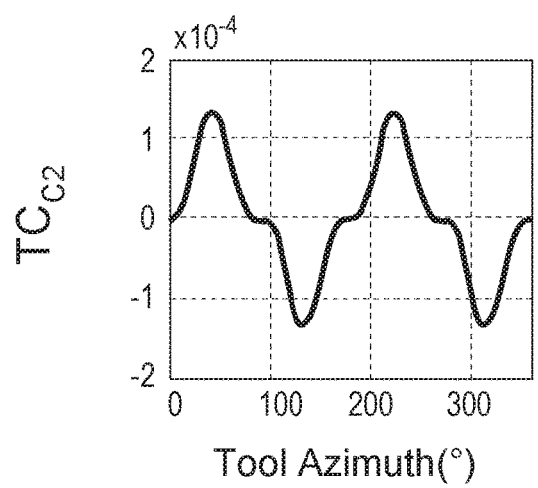
Figure 5P:
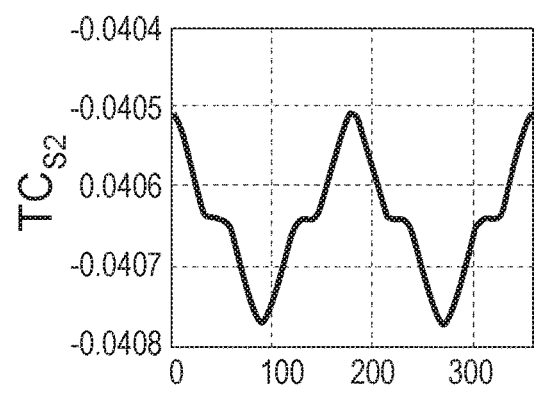

First, modeling responses are generated for a distance from the source 402 to the tool center equal to 1 m. These responses at 1 m are used to generate tool constant matrix as described above for each sensor. FIGS. 5A-5P are plots of calibration coefficients for tool constant matrix libraries with respect to different tool azimuth to the excitation source for the four sensors of FIG. 4. Modeling responses at $\beta_i$, $\beta_i+2°$, $\beta_i+180°$, $\beta_i+182°$ are used to calculate tool constant matrix for tool azimuth of $\beta_i$. FIGS. 5A-5D are the tool constant matrix libraries for sensor 410-1. FIGS. 5E-5H are the tool constant matrix libraries for sensor 410-2. FIGS. 5I-5L are the tool constant matrix libraries for sensor 410-3. FIGS. 5M-5P are the tool constant matrix libraries for sensor 410-4.

Then, modeling responses of the four sensors are created when the tool center is 5 m away from the line source (R=5 m). Equation (4) describes how to decouple the modeling responses at 5 m and determine the ranging distance using the calibration coefficients determined for the distance 1 m.

$$[M_{Sensor1} \quad M_{Sensor2} \quad M_{Sensor3} \quad M_{Sensor4}] =$$

$$[H\cos(\beta_1+\beta_{ref}) \quad H\sin(\beta_1+\beta_{ref}) \quad GH\cos(2(\beta_1+\beta_{ref})) \quad GH\sin(2(\beta_1+\beta_{ref}))] \times \begin{bmatrix} TC_{c1}(Sensor1) & TC_{c1}(Sensor2) & TC_{c1}(Sensor3) & TC_{c1}(Sensor4) \\ TC_{s1}(Sensor1) & TC_{s1}(Sensor2) & TC_{s1}(Sensor3) & TC_{s1}(Sensor4) \\ TC_{c2}(Sensor1) & TC_{c2}(Sensor2) & TC_{c2}(Sensor3) & TC_{c2}(Sensor4) \\ TC_{s2}(Sensor1) & TC_{s2}(Sensor2) & TC_{s2}(Sensor3) & TC_{s2}(Sensor4) \end{bmatrix} \quad (4)$$

The measurements at 5 m at one particular tool azimuth angle are input as measurement matrix in Equation (4), and tool constant matrix is created based on the coefficients in FIGS. 5A-5P using modeling responses at 1 m. So, the design matrix in Equation (4), used to calculate ranging measurement, is unknown. Equation (4) can be simplified as:

[Measurement Matrix]$_{1×4}$=[Design Matrix]$_{1×4}$×[Tool Constant Matrix]$_{4×4}$ \qquad (5)

Therefore, using the measurement matrix to multiply the inverse of tool constant matrix, the design matrix can be calculated by equation (6) as:

[Design Matrix]$_{1×4}$=[Measurement Matrix]$_{1×4}$×[Tool Constant Matrix]'$_{4×4}$ \qquad (6)

where the "'" indicates inverse. Then, there are four items obtained from the design matrix that can be used to calculate the total field H and gradient field GH corresponding to the given source as shown in equations (7A) and (7B).

Total Field $H=\sqrt{\text{DesignMatrix}(1)^2+\text{DesignMatrix}(2)^2}$ \qquad (7A)

Gradient Field $GH=\sqrt{\text{DesignMatrix}(3)^2+\text{DesignMatrix}(4)^2}$ \qquad (7B)

where Design Matrix (X) refers to the $X^{th}$ component of the Design Matrix. The ranging distance R can be calculated by $R=|H/GH|$, \qquad (8)

with the ranging direction calculated as

Ranging Direction=$\tan^{-1}$(Design Matrix(2)/Design Matrix(1)). \qquad (9)

Figure 6:
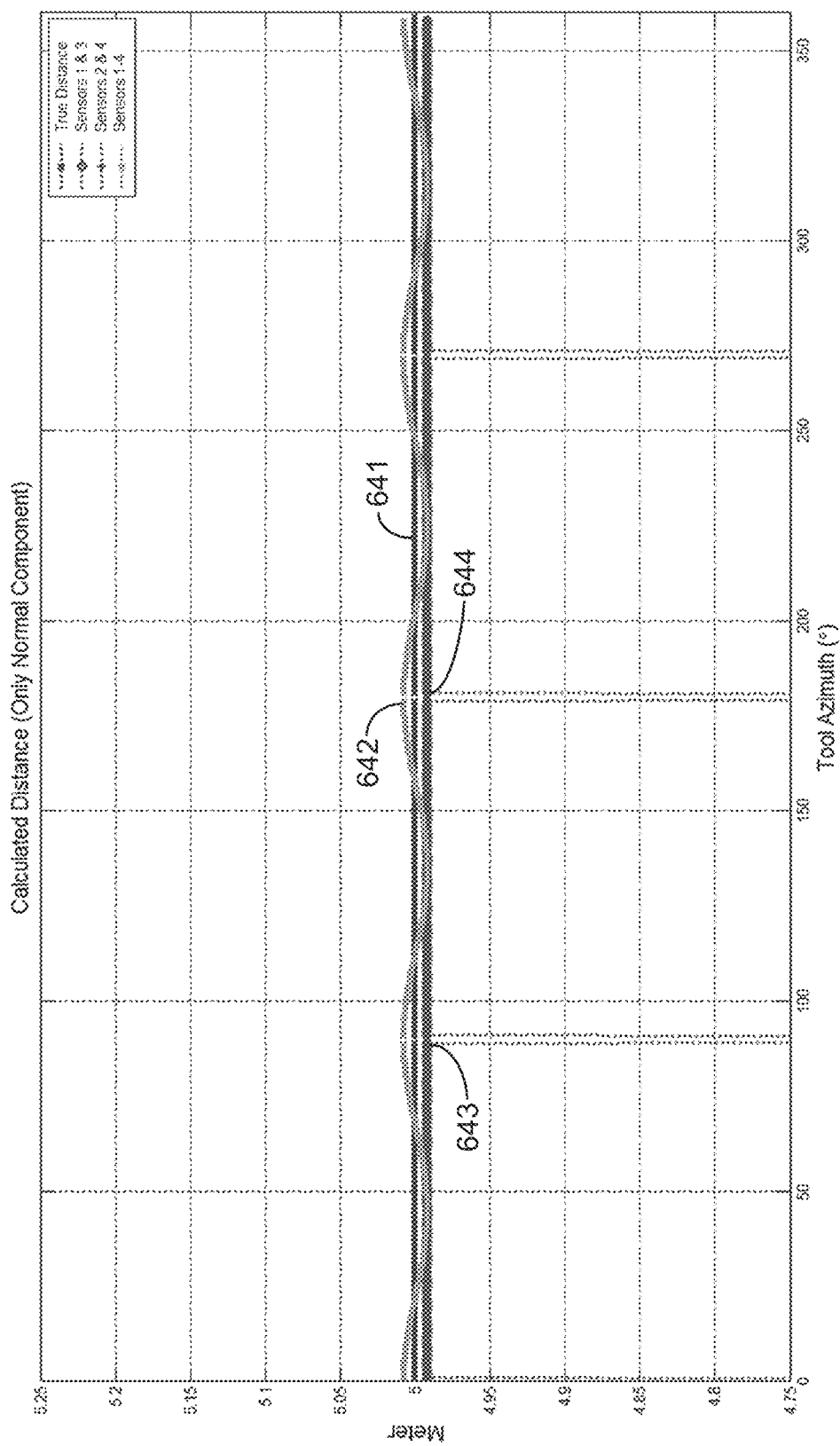
FIG. 6 is a plot of calculated distances using different sensor sets as shown in FIG. 4 in accordance with various embodiments.

FIG. 6 is a plot of calculated distances using different sensor sets as shown in FIG. 4. FIG. 6 shows the calculations when measurements are from modeling at 5 m away from the line source and the calibrations are based on the modeling at 1 m away from the line source. Curve 641 shows the true distance, which is 5 m. Curve 643 shows the calculations only using sensor 1 and sensor 3, and curve 644 shows the calculations only using sensor 2 and sensor 4. There are four angles having blind spots for the use of only two sensors, which are 0°, 90°, 180°, and 270°. Consequently, curve 642 indicates the calculations using all four sensors to avoid the blind spots. As shown in the results, all calculations are able effectively to determine true distance of 5 m.

Figure 7:
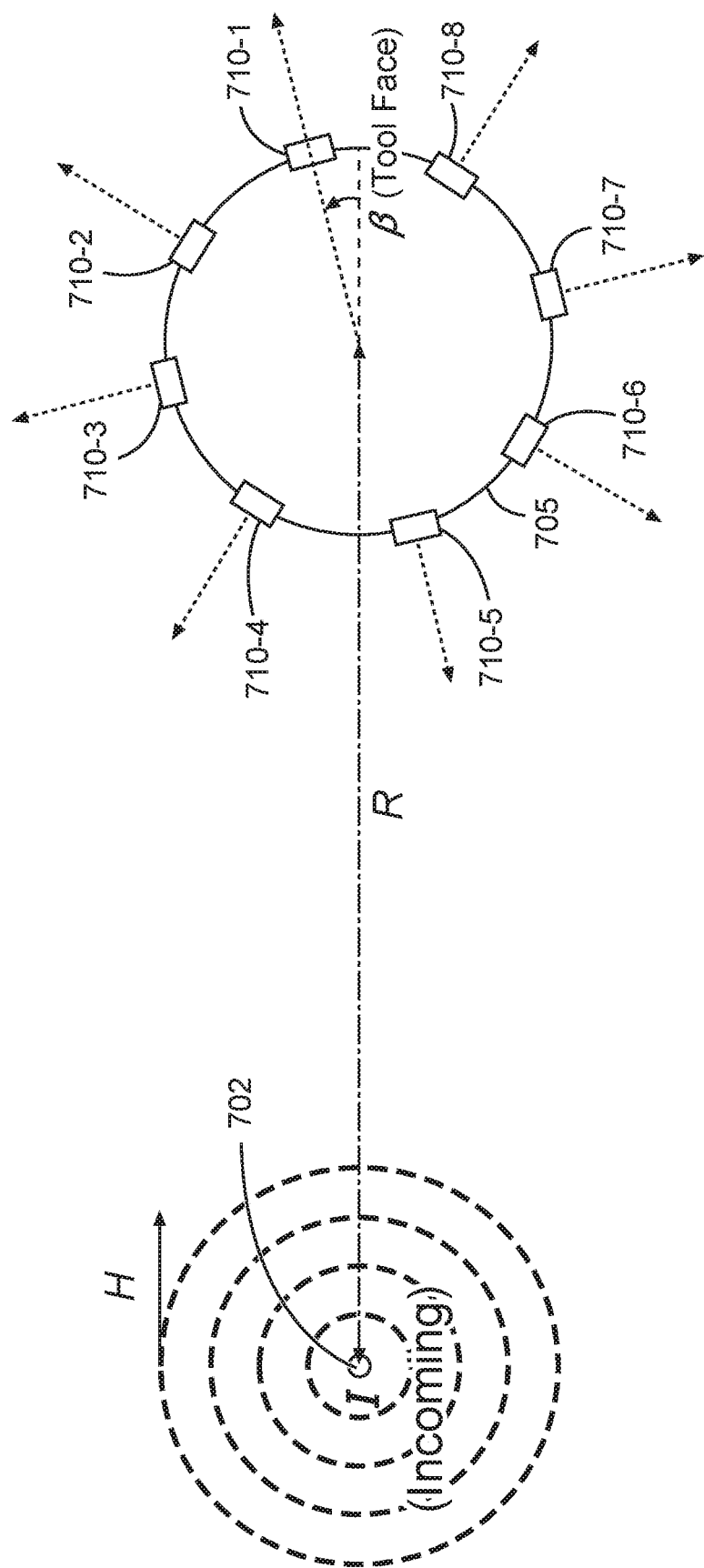
FIG. 7 is a sketch of a line source and an example ranging tool equipped with eight normal component sensors, in accordance with various embodiments.
Figure 8:
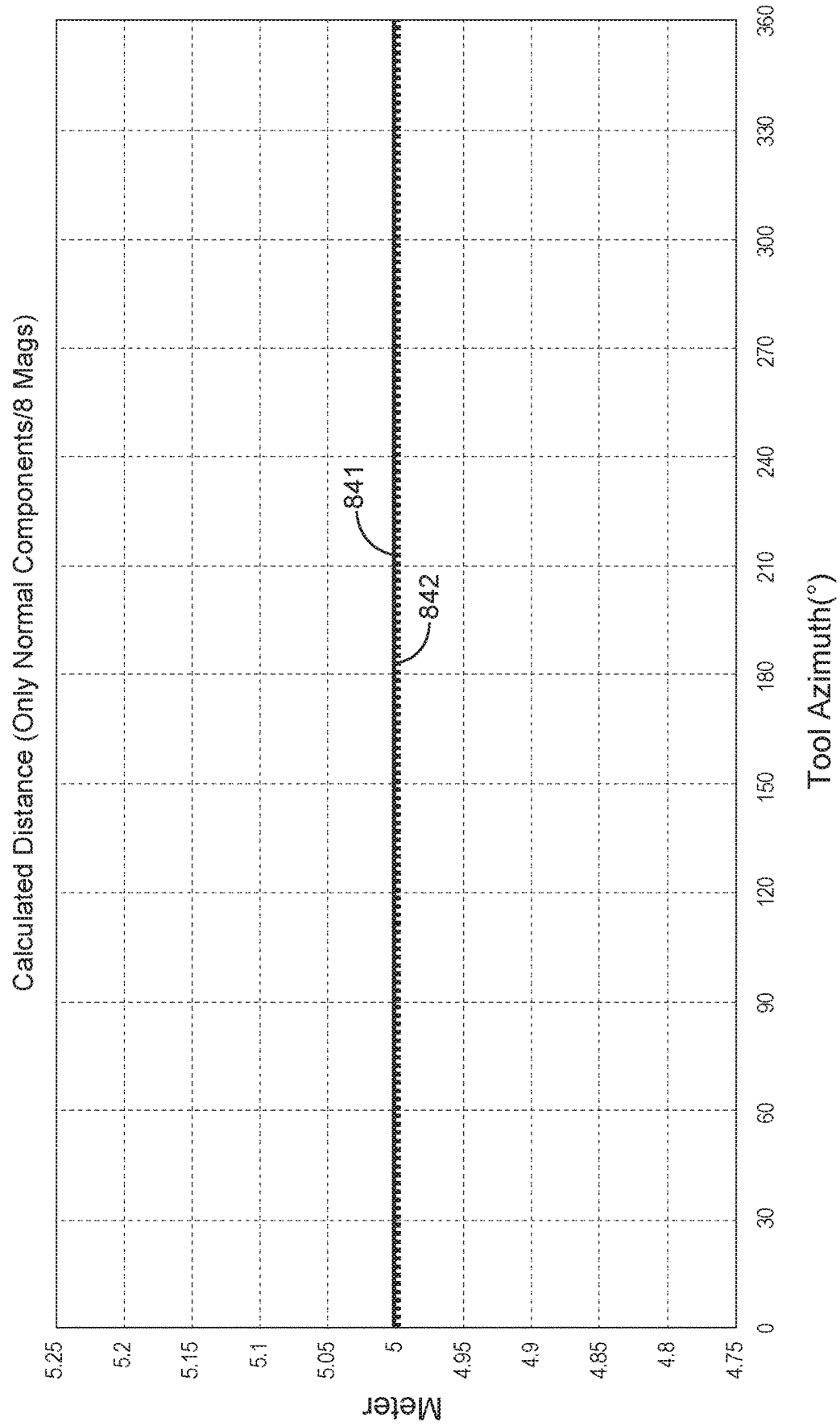
FIG. 8 is a plot of calculated distances using the eight sensors in FIG. 7, in accordance with various embodiments.

It is noted that there are tiny differences between calculated distance and true distance in FIG. 6 due to field approximation in equation (1) and equation (2). On the other hand, using more components in a ranging distance calculation, such as eight normal component sensors in FIG. 7, will help minimize such differences. FIG. 7 is a sketch of a line source 702 and a ranging tool 705 equipped with eight normal component sensors 710-1, 710-2, 710-3, 710-4, 710-5, 710-6, 710-7, and 710-8. The eight normal components are disposed 45° azimuthally separated from each other. The line source 702 and the ranging tool 705 are separated by a distance R between the centers of the two structures. FIG. 8 is a plot of calculated distances using the eight sensors in FIG. 7. FIG. 8 shows the corresponding calculated distance from using similar methods mentioned above. As shown in FIG. 8, the calculated distance in curve 842 is essentially the same as the true distance of curve 841 at any tool azimuth to the source.

The matrix operations for the eight sensor configuration follows that of the four sensor configuration using field measurements and a tool constant matrix obtained and computed from a lab test with respect to a design matrix used to calculate ranging measurement.

$$[M_{Sensor1} \quad M_{Sensor2} \quad \ldots \quad M_{Sensor8}] =$$

$$[H\cos(\beta_1 + \beta_{ref}) \quad H\sin(\beta_1 + \beta_{ref}) \quad GH\cos(2(\beta_1 + \beta_{ref})) \quad GH\sin(2(\beta_1 + \beta_{ref}))] \times \begin{bmatrix} TC_{c1}(Sensor1) & TC_{c1}(Sensor2) & \ldots & TC_{c1}(sensor8) \\ TC_{s1}(Sensor1) & TC_{s1}(Sensor2) & \ldots & TC_{s1}(Sensor8) \\ TC_{c2}(Sensor1) & TC_{c2}(Sensor2) & \ldots & TC_{c2}(Sensor8) \\ TC_{s2}(Sensor1) & TC_{s2}(Sensor2) & \ldots & TC_{s2}(Sensor8) \end{bmatrix}$$

(10)

This expression can be written as

[Field Measurements]$_{1\times 8}$=[Design Matrix]$_{1\times 4}$×[Tool Constant Matrix]$_{4\times 8}$     (11)

By matrix manipulation, the design matrix can be expressed as

[Field Measurements]$_{1\times 8}$×[Tool Constant Matrix]'$_{8\times 4}$=Design Matrix]$_{1\times 4}$×([Tool Constant Matrix]$_{4\times 8}$×[Tool Constant Matrix]$_{8\times 4}$)$_{4\times 4}$     (12)

which becomes

[Design Matrix]$_{1\times 4}$=[Field Measurements]$_{1\times 8}$[Tool Constant Matrix]'$_{8\times 4}$×inv([Tool Constant Matrix]$_{4\times 8}$×[Tool Constant Matrix]'$_{8\times 4}$)$_{4\times 4}$     (13)

where the "'" again indicates inverse, as does "inv." The total field H and the gradient field GH can be found as in equations (7A) and (7B). The ranging distance can be found as in equation (8) and the ranging direction can be found as in equation (9).

Figure 9:
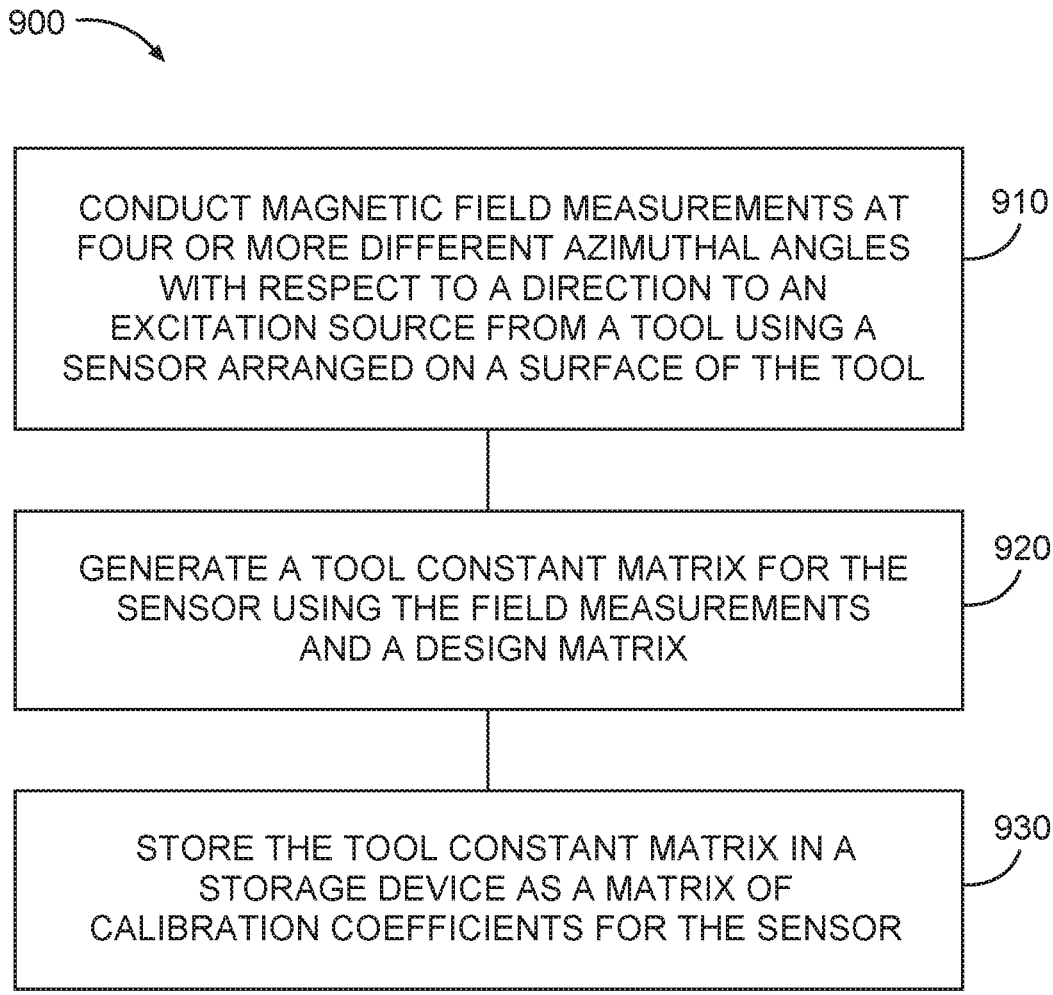
FIG. 9 is a flow diagram of features of an example method of generating calibration coefficients for sensors of a tool, in accordance with various embodiments.

FIG. 9 is a flow diagram of features of an embodiment of an example method 900 of generating calibration coefficients for sensors of a tool. Method 900 can be applied to each sensor in a set of sensors of a tool to generate a tool constant matrix for the respective sensor. At 910, magnetic field measurements are conducted at four or more different azimuthal angles with respect to a direction to an excitation source from a tool using the sensor arranged on a surface of the tool. The excitation source has a current of a known value flowing in the excitation source. The excitation source may be a line source or an approximate line source. The tool is separated from the excitation source at a known distance from center of the tool to center of the excitation source. The sensors may be oriented in a tangential direction or in a normal direction to the different azimuthal angles.

At 920, using a processor, the tool constant matrix for the sensor is generated using the field measurements and a design matrix. The design matrix can be based on the known value of the current, the known distance, the four or more different azimuthal angles, and known orientation of the sensor. In an example, generating the tool constant matrix for the sensor can include generating the tool constant at a selected azimuthal angle relative to the excitation source by using the different azimuthal angles to include the selected azimuthal angle relative to the excitation source, an angle equal to the selected azimuthal angle plus a selected increment, an angle equal to the selected azimuthal angle plus one-hundred eighty degrees, and an angle equal to the selected azimuthal angle plus one-hundred eighty degrees plus the selected increment. In another example, the selected increment may equal ten degrees. Other increments may be used depending on a number of factors including, but not limited to, operational limitations of the respective sensor.

For tool azimuthal of β, one can choose four different angles of $\beta_i$, $\beta_i+\beta_1$, $\beta_i+\beta_2$, $\beta_i+\beta_3$ to calculate tool constant matrix where $\beta_1$, $\beta_2$, $\beta_3$ are different. As long as the sensor measurements at the selected four different angles are sensitive to an excitation source, such as a line source, the sensor measurements at the four angles can be used to calculate the tool constant matrix for the sensor at that particular tool azimuthal angle ($\beta_i$) relative to the excitation source.

At 930, the tool constant matrix is stored in a storage device as a matrix of calibration coefficients for the sensor. The storage device may be accessed to retrieve one or more tool constant matrices to conduct ranging operations with respect to a well. For example, such tool constant matrices may be used in steam assisted gravity drainage (SAGD) operations.

The work flow shown in FIG. 9 or similar work flow can be repeated for different azimuthal directions relative to the excitation source, generating a plurality of tool constant matrices for the respective sensor that can be stored. Storing the plurality of tool constant matrices generates a tool constant matrix library for the respective sensor, which provides a tool constant matrix at each azimuthal angle relative to the excitation source. Examples of tool constant matrix libraries are shown in FIGS. 3A-D and FIGS. 5A-P.

The method 900 or similar method can include forming a set of tool constant matrices for the respective sensor, each matrix of the set of tool constant matrices generated for a different sensor direction relative to the excitation source; and storing the set of tool constant matrices in a tool constant matrix library for the respective sensor. Such methods can include forming the set of tool constant matrices for the respective sensor for the different sensor directions relative to the excitation source to include forming the set of tool constant matrices at a plurality of different azimuthal angles in the range from 0° to 360°.

Figure 10:
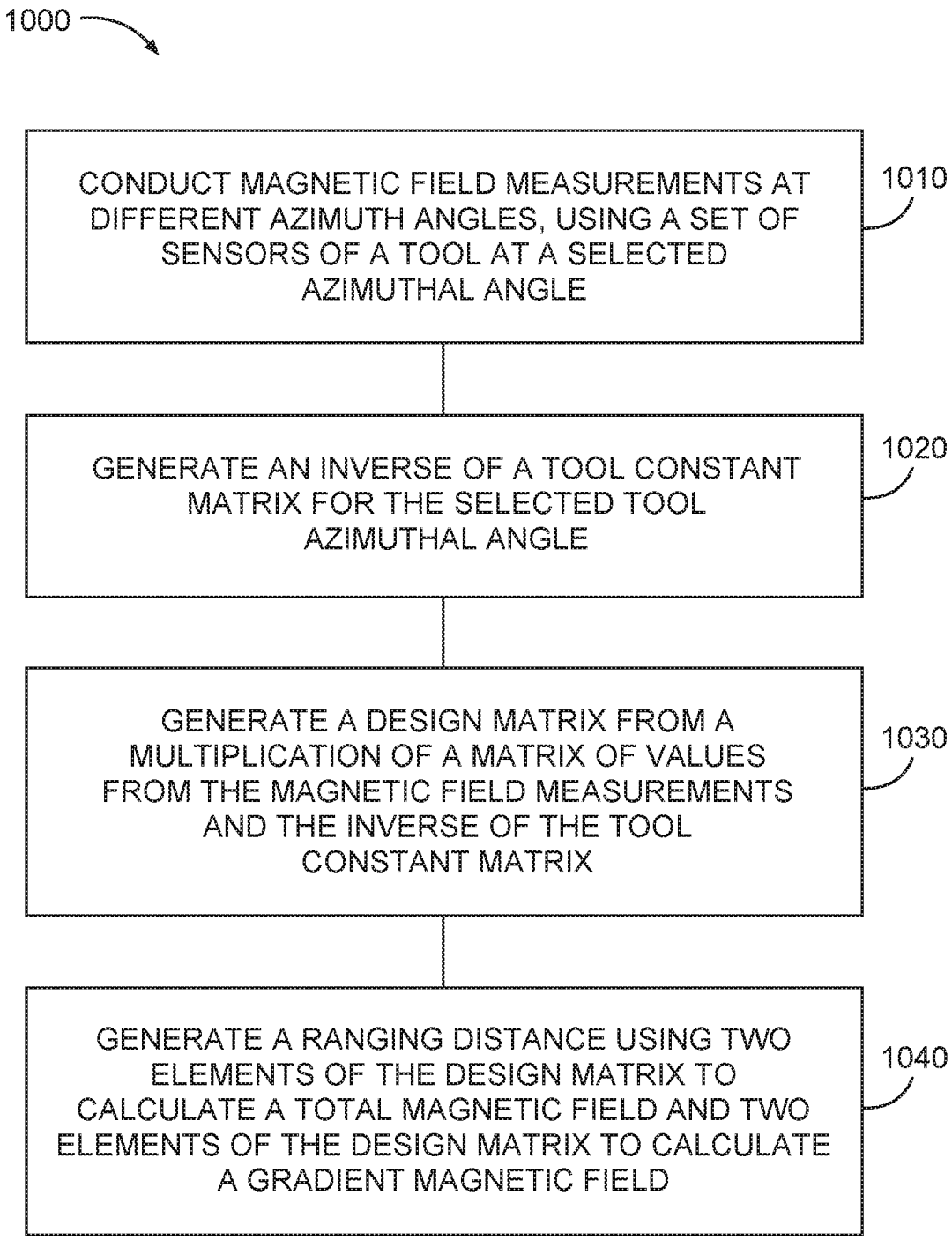
FIG. 10 is a flow diagram of features of an example method of generating a ranging distance from a tool to a conductive structure, in accordance with various embodiments.

FIG. 10 is a flow diagram of features of an embodiment of an example method 1000 of generating a ranging distance from a tool to a conductive structure. The ranging operation may be conducted at a drilling site, such as but not limited to, a well site at which SAGD operations are conducted. The conductive structure may be a casing in a target well. In certain applications, such as in the build section in SAGD wells, the well may be bent with a certain angle. At 1010, magnetic field measurements are conducted at different azimuth angles, using a set of sensors of a tool at a selected tool azimuth angle, in response to current flowing in a conductive structure. The tool and the structure are disposed below earth surface. One sensor can have its own tool constant matrix with four unknown components as described in equations (3), (4), or (10). Therefore, to decouple the four unknown components, the sensor must take measurements at least at four different azimuthal angles relative to an excitation source. So for configuration of four sensors in FIG. 4 or eight sensors in FIG. 7, the sensors take at least four measurements at four different tool azimuthal angles to decouple each tool constant for the individual sensor. The magnetic field can be generated from current flowing in the conductive structure. The set of sensors can include eight sensors. The set is not limited to four or eight sensors, but may include more or less than four sensors.

Using a processor, values of the magnetic field measurements, can be processed to generate a ranging distance from the tool to the conductive structure. At 1020, an inverse of a tool constant matrix for the selected tool azimuthal angle is generated. The tool constant matrix provides a matrix of calibration coefficients for each sensor of the set used in the measurement. At 1030, a design matrix is generated from a multiplication of a matrix of values from the magnetic field measurements and the inverse of the tool constant matrix. At 1040, the ranging distance is generated using two elements of the design matrix to calculate a total magnetic field and two elements of the design matrix to calculate a gradient magnetic field.

Method 1000 or methods similar to method 1000 can comprise using only sensors oriented normally to a center of the tool or only sensors oriented tangentially to the center of the tool. Method 1000 or methods similar to method 1000 can comprise generating a ranging direction using a ratio of the two elements of the design matrix used to calculate the total magnetic field.

Method 1000 or methods similar to method 1000 can comprise selecting the tool constant matrix by: prior to generating the ranging distance, selecting a first tool constant matrix from a tool constant library; calculating direction to the conductive structure using an application of the selected first tool constant matrix to the magnetic field measurements; and selecting the tool constant matrix from the tool constant library based on the calculated direction. Intensity field of the magnetic field, can be used to calculate the direction. Using the set of sensors can include using at least two sensors with measurements in one stationary position of the tool, or using one sensor at least two azimuthal measurements due to a rotation operation of the tool.

In various embodiments, a machine-readable storage device can comprise instructions stored thereon, which, when performed by a machine, cause the machine to perform operations, the operations comprising one or more features similar to or identical to features of methods and techniques described with respect to method 900, method 1000, combinations of method 900 and method 1000, variations thereof, and/or features of other methods taught herein. The physical structures of such instructions may be operated on by one or more processors.

Executing these physical structures can cause the machine to perform operations, the operations comprising: for each sensor of a set of sensors, generating a tool constant matrix by: conducting magnetic field measurements at four or more different azimuthal angles with respect to a direction to an excitation source from a tool using the sensor arranged on a surface of a tool, the excitation source having a current of a known value flowing in the excitation source, the tool separated from the excitation source at a known distance from center of the tool to center of the excitation source; generating, using a processor, the tool constant matrix for the sensor using the field measurements and a design matrix, the design matrix based on the known value of the current, the known distance, the four or more different azimuthal angles, and known orientation of the sensor; and storing the tool constant matrix in a storage device as a matrix of calibration coefficients for the sensor.

Executing the instructions can include a number of additional features. The sensors may be oriented in a tangential direction or in a normal direction at the different azimuthal angles. In an example, generating the tool constant matrix for the sensor can include generating the tool constant at a selected azimuthal angle relative to the line source by using the four different azimuthal angles to include the selected azimuthal angle relative to the line source, an angle equal to the selected azimuthal angle plus a selected increment, an angle equal to the selected azimuthal angle plus one-hundred eighty degrees, and an angle equal to the selected azimuthal angle plus one-hundred eighty degrees plus the selected increment. In another example, the selected increment can equal two degrees. Other increments may be used depending on a number of factors including, but not limited to, operational limitations of the respective sensor. For tool azimuthal of $\beta_i$, one can choose four different angles of $\beta_i$, $\beta_i+\beta_1$, $\beta_i+\beta_2$, and $\beta_i+\beta_3$ to calculate tool constant matrix where $\beta_1$, $\beta_2$, and $\beta_3$ are different. As long as the sensor measurements at the selected four different angles are sensitive to an excitation source, such as a line source, the sensor measurements at the four angles can be used to calculate the tool constant matrix for the sensor at that particular tool azimuthal angle ($\beta_i$) relative to the excitation source.

The operations of such a machine-readable storage device can include: forming a set of tool constant matrices for the respective sensor, each matrix of the set of tool constant matrices generated for a different sensor direction relative to the excitation source; and storing the set of tool constant matrices in a tool constant matrix library for the respective sensor. Forming the set of tool constant matrices for the respective sensor for the different sensor directions relative to the excitation source can include forming the set of tool constant matrices at a plurality of different azimuthal angles in the range from 0° to 360°.

In various embodiments, executing instructions realized by physical structures in a machine-readable storage device can cause the related machine to perform operations, the operations comprising: conducting magnetic field measurements at different azimuth angles, using a set of sensors of a tool at a selected tool azimuth angle, in response to current flowing in a conductive structure, the tool and the conductive structure disposed below earth surface; and processing values of the magnetic field measurements, using a processor, to generate a ranging distance from the tool to the conductive structure, the processing including: generating an inverse of a tool constant matrix for the selected tool azimuthal angle, the tool constant matrix being a matrix of calibration coefficients for each sensor of the set; generating a design matrix from a multiplication of a matrix of values from the magnetic field measurements and the inverse of the tool constant matrix; and generating the ranging distance using two elements of the design matrix to calculate a total magnetic field and two elements of the design matrix to calculate a gradient magnetic field.

Executing the instructions can include a number of additional features. The set of sensors can include eight sensors. The set of sensors can include any number of sensors. The operations can comprise using only sensors oriented normally to a center of the tool or only sensors oriented tangentially to the center of the tool. Other orientations may be used. The operations can comprise generating a ranging direction using a ratio of the two elements of the design matrix used to calculate the total magnetic field.

The operations of such a machine-readable storage device can include: selecting the tool constant matrix by: prior to generating the ranging distance, selecting a first tool constant matrix from a tool constant library; calculating direction to the conductive structure using an application of the selected first tool constant matrix to the magnetic field measurements; and selecting the tool constant matrix from the tool constant library based on the calculated direction. Using a set of sensors can include using at least 2 sensors with measurements in a stationary position of the tool, or using one sensor at least two azimuthal measurements due to a rotation operation of the tool. The operations can include generating a ranging direction using a ratio of the two elements of the design matrix used to calculate the total magnetic field.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory module 1155 of FIG. 11 or memory module 1255 of FIG. 12. While each of memory modules 1155, 1255 is shown as a single unit, terms such as "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms and one or more instances of memory devices or modules (whether main memory; cache storage, either internal or external to a processor; or buffers). Terms such as "memory module," "machine-readable medium," "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

Figure 11:
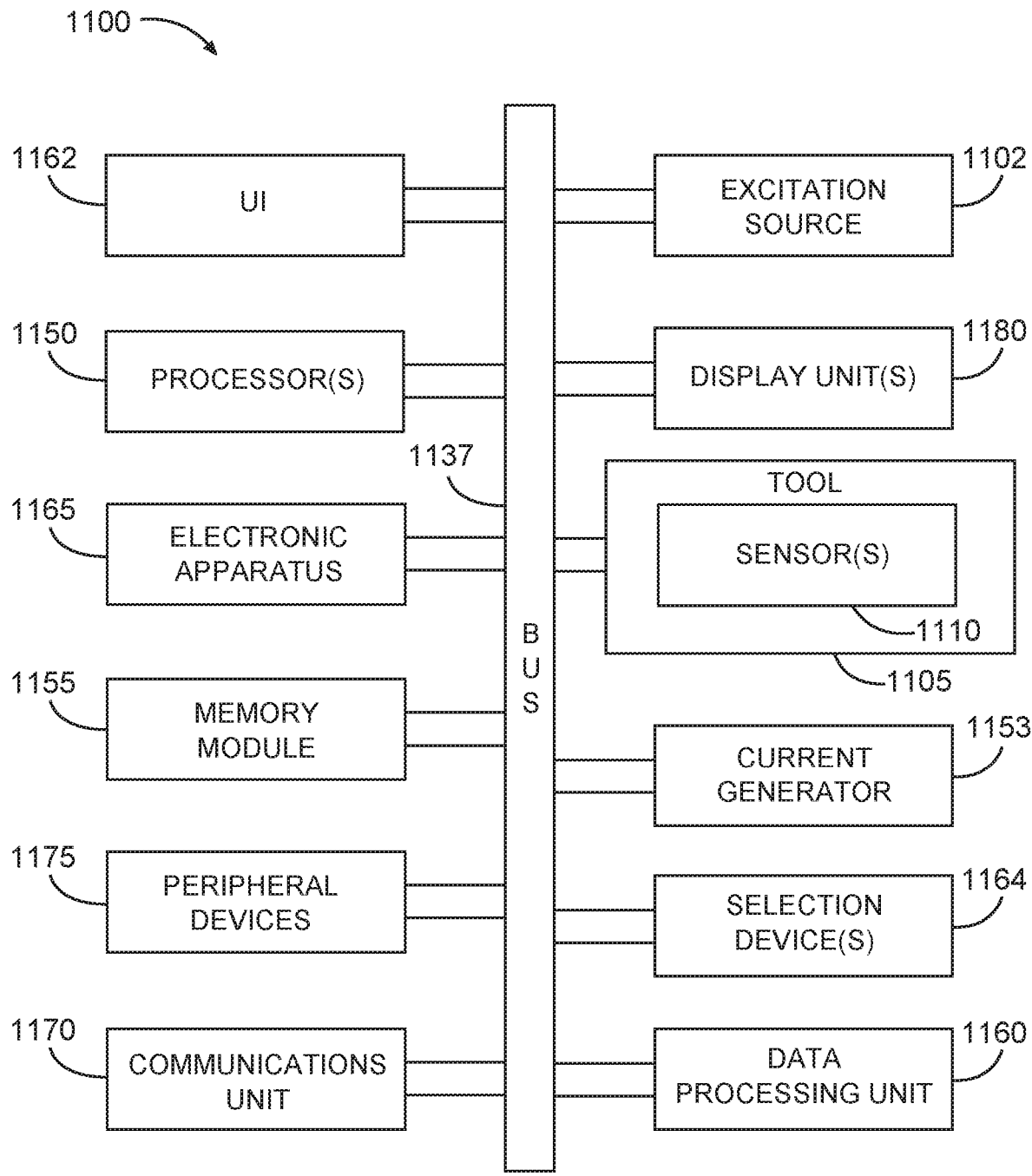
FIG. 11 is a block diagram of an example system operable to generate calibration coefficients for sensors of a tool, in accordance with various embodiments.

FIG. 11 is a block diagram of an embodiment of an example system 1100 operable to generate calibration coefficients for sensors 1110 of a tool 1105. The tool 1105 may be viewed as one of a number of workpieces on which system 1100 can operate with respect to the generation of calibration coefficients for sensors. The system 1100 can comprise a processor 1150 and a current generator 1153 coupled to a excitation source 1102 to provide current to the excitation source 1102, the current having a known value. The processor 1150 can be arranged, for each sensor of a set of sensors 1110 disposed on a surface of the tool 1105, to conduct a number of operations. The processor 1150 can be arranged to: receive values of magnetic field measurements from measurements at four or more different azimuthal angles with respect to a direction to the excitation source 1102 from the tool 1105 using the sensor 1110, the tool 1105 separated from the excitation source 1102 at a known distance from center of the tool 1105 to center of the excitation source 1102, generate a tool constant matrix for the sensor 1110 using the field measurements and a design matrix, the design matrix based on the known value of the current, the known distance, the four or more different azimuthal angles, and known orientation of the sensor 1110; and store the tool constant matrix in a storage device 1155 as a matrix of calibration coefficients for the respective sensor.

The set of sensors 1110 can include a number of sensors. The respective sensor of the set of sensors 1110 can be oriented in a tangential direction or in a normal direction at the different azimuthal angles. Other orientations may be used.

The processor 1150 can be realized as one or more processors. The processor can be arranged to: form a set of tool constant matrices for the respective sensor, each matrix of the set of tool constant matrices generated for a different sensor direction relative to the excitation source; and store the set of tool constant matrices in a tool constant matrix library for the respective sensor. The set of tool constant matrices for the respective sensor can include tool constant matrices at a plurality of different azimuthal angles in the range from 0° to 360°.

The system 1100 may be arranged to operatively perform methods identical or similar to the method 900. The system 1100 may also perform other operations as taught herein. For example, the system 1100 may perform one or more of the operations of methods identical or similar to the method 1000.

The system 1100 may include other components. The system 1100 can include a user interface (UT) 1162 operable with the processors 1150, a data processing unit 1160 operable with the UT 1162, where the processors 1150, the UT 1162, and the data processing unit 1160 are structured to be operated according to any calibration technique similar to or identical to the calibration techniques as taught herein. In an embodiment, processor 1150 can be realized as a single processor or a group of processors. Processors of the group of processors may operate independently depending on an assigned function. The data processing unit 1160 may operate as a dedicated unit to generate calibration coefficients for sensors 1110, with the processor 1150 performing other related functions. The data processing unit 1160 may include one or more processors and data storage devices. The system 1100 can be arranged to perform various operations on data acquired from the tool 1105, in a manner similar or identical to any of the processing techniques discussed herein. The system 1100 can be arranged as a distributed system.

The system 1100 can include a memory module 1155, an electronic apparatus 1165, and a communications unit 1170. The processor(s) 1150, the memory module 1155, and the communications unit 1170 can be arranged to operate as a processing unit to control management of tool 1105 and to perform operations on data signals collected by the tool 1105. The memory module 1155 can include a database having information and other data such that the system 1100 can operate on data from the tool 1105. In an embodiment, the data processing unit 1160 can be distributed among the components of the system 1100 including memory module 1155 and/or the electronic apparatus 1165.

The communications unit 1170 can include communication interfaces to communicate within the system 1100 and to devices or systems external to the system 1100. The communications unit 1170 may use combinations of wired communication technologies and wireless technologies. The communications unit 1170 can include devices to communicate over local area networks and/or wide area networks.

The system 1100 can also include a bus 1137, where the bus 1137 provides electrical conductivity among the components of the system 1100. The bus 1137 can include an address bus, a data bus, and a control bus, each independently configured. Other types of communication pathways can be provided by the bus 1137. The bus 1137 can be realized using a number of different communication mediums that allows for the distribution of components of the system 1100. Use of the bus 1137 can be regulated by the processor(s) 1150. The bus 1137 can include a communications network to transmit and receive signals including data signals and command and control signals.

In various embodiments, the peripheral devices 1175 can include drivers to provide input to the current generator 1153, additional storage memory and/or other control devices that may operate in conjunction with the processor(s) 1150 and/or the memory module 1155. Display unit(s) 1180 can be arranged with a screen display that can be used with instructions stored in the memory module 1155 to implement the UT 1162 to manage the operation of the tool 1105 and/or components distributed within the system 1100. Such a user interface can be operated in conjunction with the communications unit 1170 and the bus 1137. The display unit(s) 1180 can include a video screen, a printing device, or other structure to visually project data/information and images. The system 1100 can include a number of selection devices 1164 operable with the UI 1162 to provide user inputs to operate the data processing unit 1160 or its equivalent. The selection device(s) 1164 can include one or more of a touch screen or a computer mouse operable with the UI 1162 to provide user inputs to operate the data processing unit 1160 or other components of the system 1100.

Figure 12:
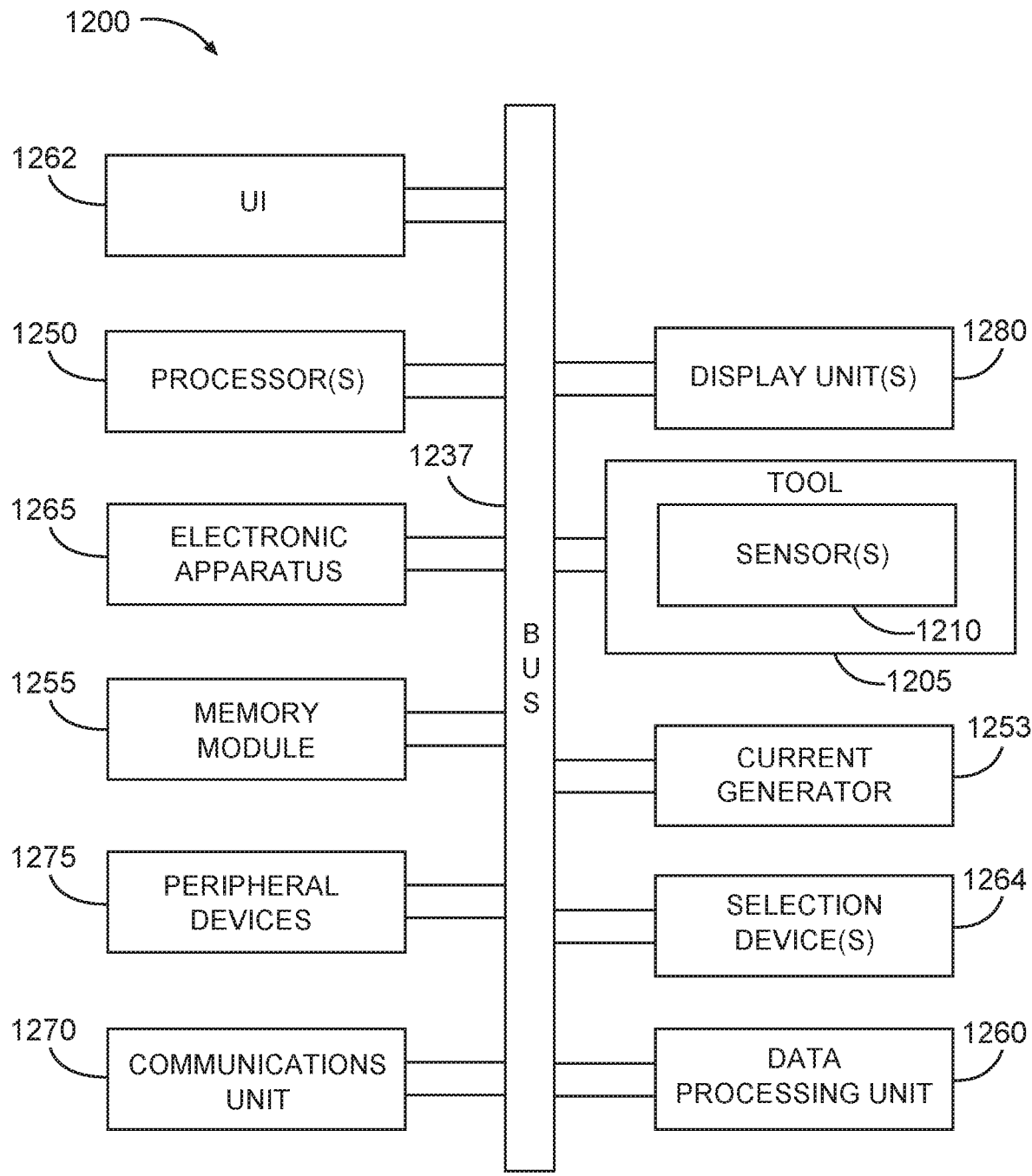
FIG. 12 is a block diagram of an embodiment of an example system operable to conduct ranging operation, in accordance with various embodiments.

FIG. 12 is a block diagram of an embodiment of an example system 1200 operable to conduct ranging operations. The system 1200 can comprise a tool 1205 and a processor 1250. The tool 1205 can include a set of sensors 1210 disposed on a surface of the tool 1205, the set of sensors 1210 structured to sense a magnetic field to provide values of magnetic field measurements, in response to current flowing in a conductive structure, at a selected tool azimuth angle, the sensors 1210 of the set arranged on the surface of the tool 1205 at different azimuthal angles. The processor 1250 can be arranged, for each sensor of the set of sensors, to process the values of the magnetic field measurements to generate a ranging distance from the tool 1205 to the conductive structure. The process executed by the processor 1250 can include: generation of an inverse of a tool constant matrix for the selected tool azimuthal angle, the tool constant matrix being a matrix of calibration coefficients for each sensor of the set used in the measurement; generation of a design matrix from a multiplication of a matrix of the values from the magnetic field measurements and the inverse of the tool constant matrix; and generation of the ranging distance by use of two elements of the design matrix to calculate a total magnetic field and two elements of the design matrix to calculate a gradient magnetic field. The processor 1250 can be arranged to generate a ranging direction by use of a ratio of the two elements of the design matrix used to calculate the total magnetic field. The set of sensors 1210 may include any number of sensors. The sensors 1210 may be arranged only oriented normally with respect to a center of the tool or only oriented tangentially with respect to the center of the tool. However, other orientations may may be used.

The system 1200 may be arranged to operatively perform methods identical or similar to the method 1000. The system 1200 may also perform other operations as taught herein. For example, the system 1200 may perform one or more of the operations of methods identical or similar to the method 900.

The system 1200 may include other components. The system 1200 can include a UI 1262 operable with the processor 1250, a data processing unit 1260 operable with the UI 1262, where the processor 1250, the UI 1262, and the data processing unit 1260 are structured to be operated according to any procedure similar to or identical to the procedures as taught herein. In an embodiment, processor 1250 can be realized as a single processor or a group of processors. Processors of the group of processors may operate independently depending on an assigned function. The data processing unit 1260 may operate as a dedicated unit to generate ranging determinations using sensors 1210, with the processor 1250 performing other related functions. The data processing unit 1260 may include one or more processors and data storage devices. The system 1200 can be arranged to perform various operations on data acquired from the tool 1205, in a manner similar or identical to any of the processing techniques discussed herein. The system 1200 can be arranged as a distributed system. For example, the system 1200 can be distributed in a borehole and/or at the surface at a wellsite.

The system 1200 can include a memory module 1255, an electronic apparatus 1265, and a communications unit 1270. The processor(s) 1250, the memory module 1255, and the communications unit 1270 can be arranged to operate as a processing unit to control management of tool 1205 and to perform operations on data signals collected by the tool 1205. The memory module 1255 can include a database having information and other data such that the system 1200 can operate on data from the tool 1205. In an embodiment, the data processing unit 1260 can be distributed among the components of the system 1200 including memory module 1255 and/or the electronic apparatus 1265.

The communications unit 1270 can include communication interfaces to communicate within the system 1200 and to devices or systems external to the system 1200. The communications unit 1270 may use combinations of wired communication technologies and wireless technologies. The communications unit 1270 can include devices to communicate over local area networks and/or wide area networks.

The communications unit 1270 can include downhole communications for communication to the surface at a well site from the tool 1205 operating in a borehole. The communications unit 1270 may use combinations of wired communication technologies and wireless technologies at frequencies that do not interfere with on-going measurements. The communications unit 1270 can allow for a portion or all of the data analysis to be conducted downhole with results provided to the UI 1262 for presentation on one or more display unit(s) 1280 aboveground. The communications unit 1270 can provide for data to be sent aboveground such that substantially all analysis is performed aboveground. The data collected by the tool 1205 can be stored with the tool 1205 that can be brought to the surface to provide the data to the one or more processors 1250, the UI 1262, and the data processing unit 1260. The communications unit 1270 can allow for transmission of commands to tool 1205 in response to signals provided by a user through the UT 1262.

The system 1200 can also include a bus 1237, where the bus 1237 provides electrical conductivity among the components of the system 1200. The bus 1237 can include an address bus, a data bus, and a control bus, each independently configured. Other types of communication pathways can be provided by the bus 1137. The bus 1237 can be realized using a number of different communication mediums that allows for the distribution of components of the system 1200. Use of the bus 1237 can be regulated by the processor(s) 1250. The bus 1237 can include a communications network to transmit and receive signals including data signals and command and control signals.

In various embodiments, the peripheral devices 1275 can include drivers to provide input to a current generator 1253, additional storage memory and/or other control devices that may operate in conjunction with the processor(s) 1250 and/or the memory module 1255. The current generator 1253 may be used to apply, at the surface at a well site, a current to a conductive structure that extends underground that is the subject of a ranging investigation. The display unit(s) 1280 can be arranged with a screen display that can be used with instructions stored in the memory module 1255 to implement the UI 1262 to manage the operation of the tool 1205 and/or components distributed within the system 1200. Such a user interface can be operated in conjunction with the communications unit 1270 and the bus 1237. The display unit(s) 1280 can include a video screen, a printing device, or other structure to visually project data/information and images. The system 1200 can include a number of selection devices 1264 operable with the UI 1262 to provide user inputs to operate the data processing unit 1260 or its equivalent. The selection device(s) 1264 can include one or more of a touch screen or a computer mouse operable with the UI 1262 to provide user inputs to operate the data processing unit 1160 or other components of the system 1100.

Figure 13:
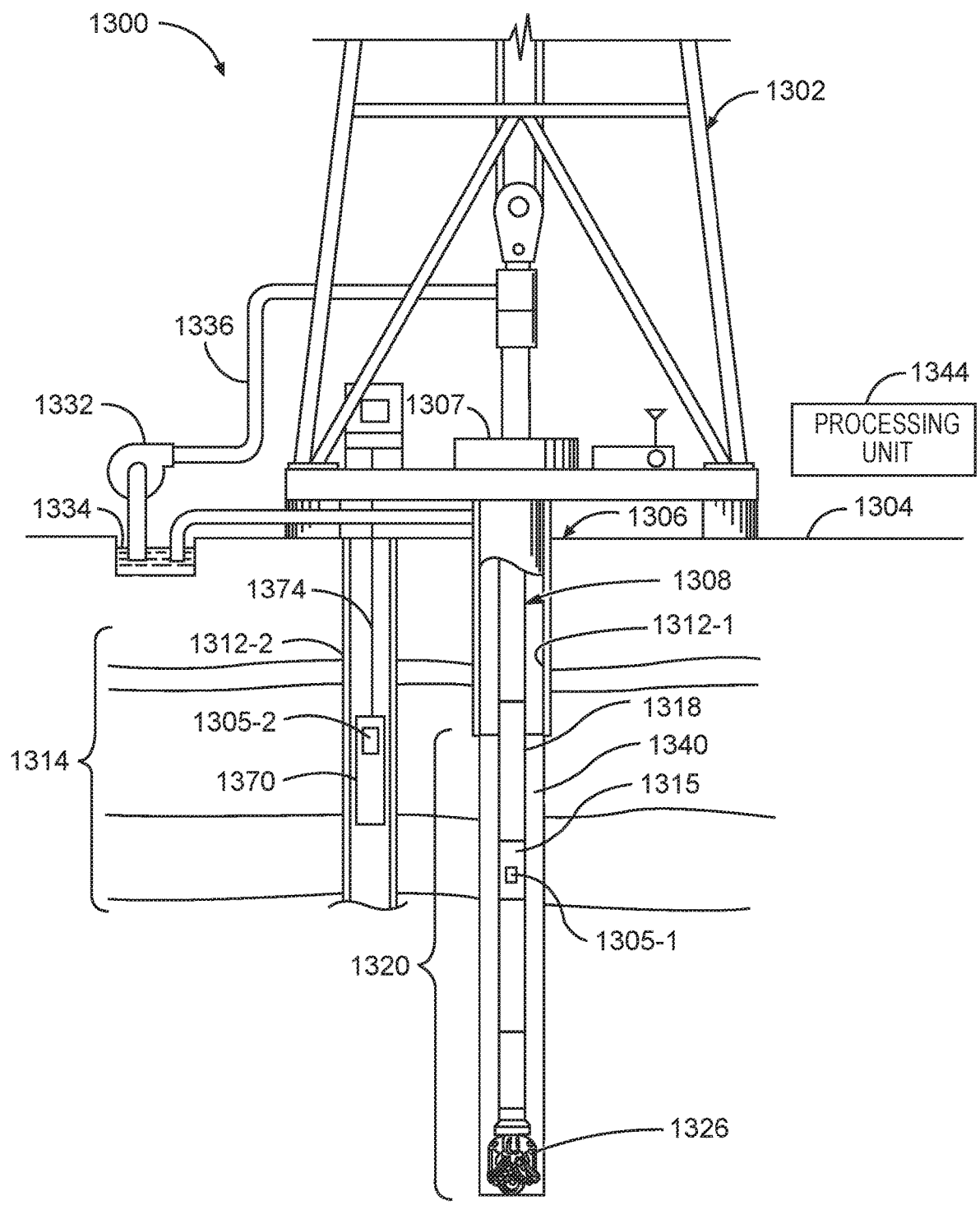
FIG. 13 is a schematic diagram of an example system at a drilling site, where the system includes a tool configured with a set of sensors to conduct ranging measurements, in accordance with various embodiments.

FIG. 13 is a schematic diagram of a system 1300 at a drilling site, where the system 1300 includes a tool 1305-1, 1305-2, or both 1305-1 and 1305-2 configured with a set of sensors. In an embodiment, the set of sensors can include at least four sensors to conduct ranging measurement from the tool 1305-1 or the tool 1305-2 with respect to a structure. The structure may be another well structure. Tools 1305-1 and 1305-2 can be realized in a similar or identical manner to arrangements taught herein.

A control unit and processing unit of the measurement tools 1305-1 and 1305-2 can be distributed among system 1300 or can be integrated with measurement tools 1305-1 and 1305-2 providing for control and analysis activities to be conducted downhole. The measurement tools 1305-1 and 1305-2 can be realized in a similar manner or an identical manner to arrangements and processing discussed herein to make ranging measurements that includes processing with libraries of tool constant matrices for the set of sensors used in operation of tool 1305-1 or tool 1305-2. A processing unit 1344 may be located at a surface 1304 of a well 1306 to operate on the measurement data collected by of tool 1305-1 or tool 1305-2 as taught herein. Alternatively, processing unit 1344 may be disposed downhole.

The system 1300 can include a drilling rig 1302 located at the surface 1304 of the well 1306 and a string of drill pipes, that is, the drill string 1308, connected together so as to form a drilling string that is lowered through a rotary table 1307 into a wellbore or borehole 1312-1. The drilling rig 1302 can provide support for the drill string 1308. The drill string 1308 can operate to penetrate the rotary table 1307 for drilling the borehole 1312-1 through subsurface formations 1314. The drill string 1308 can include drill pipe 1318 and a bottom hole assembly 1320 located at the lower portion of the drill pipe 1318.

The bottom hole assembly 1320 can include a drill collar 1315, the tool 1305 attached to the drill collar 1315, and a drill bit 1326. The drill bit 1326 can operate to create the borehole 1312-1 by penetrating the surface 1304 and the subsurface formations 1314. The tool 1305-1 can be structured for an implementation in the borehole 1312-1 as a measurements-while-drilling (MWD) system, such as a logging-while-drilling (LWD) system. The housing containing the measurement tool 1305-1 can include electronics to control the sensors of the measurement tool 1305-1. Such electronics can include a processing unit to receive sensor data and to provide ranging determination, with respect to a structure disposed downhole, to the surface over a standard communication mechanism for operating a well. Alternatively, electronics can include a communications interface to provide signals output by sensors of the measurement tool 1305-1 to the surface over a standard communication mechanism for operating a well, where these output signals can be analyzed at the processing unit 1344 at the surface to receive sensor data and to provide ranging determination.

During drilling operations, the drill string 1308 can be rotated by the rotary table 1307. In addition to, or alternatively, the bottom hole assembly 1320 can also be rotated by a motor (e.g., a mud motor) that is located downhole. The drill collars 1315 can be used to add weight to the drill bit 1326. The drill collars 1315 also can stiffen the bottom hole assembly 1320 to allow the bottom hole assembly 1320 to transfer the added weight to the drill bit 1326, and in turn, assist the drill bit 1326 in penetrating the surface 1304 and subsurface formations 1314.

During drilling operations, a mud pump 1332 can pump drilling fluid (sometimes known by those of skill in the art as "drilling mud") from a mud pit 1334 through a hose 1336 into the drill pipe 1318 and down to the drill bit 1326. The drilling fluid can flow out from the drill bit 1326 and be returned to the surface 1304 through an annular area 1340 between the drill pipe 1318 and the sides of the borehole 1312-1. The drilling fluid may then be returned to the mud pit 1334, where such fluid is filtered. In some embodiments, the drilling fluid can be used to cool the drill bit 1326, as well as to provide lubrication for the drill bit 1326 during drilling operations. Additionally, the drilling fluid may be used to remove subsurface formation 1314 cuttings created by operating the drill bit 1326.

In various embodiments, the measurement tool 1305-2 may be included in a tool body 1370 coupled to a logging cable 1374 such as, for example, for wireline applications. The tool body 1370 containing the measurement tool 1305-2 can include electronics to control the sensors of the measurement tool 1305-2. Such electronics can include a processing unit to receive sensor data and to provide ranging determination, with respect to a structure disposed downhole, to the surface over a standard communication mechanism for operating a well. Alternatively, electronics can include a communications interface to provide signals output by sensors of the measurement tool 1305-2 to the surface over a standard communication mechanism for operating a well, where these output signals can be analyzed at the processing unit 1344 at the surface to receive sensor data and to provide ranging determination. The logging cable 1374 may be realized as a wireline (multiple power and communication lines), a mono-cable (a single conductor), and/or a slick-line (no conductors for power or communications), or other appropriate structure for use in the borehole 1312-2. Though, for convenience, FIG. 13 depicts both an arrangement for wireline applications and an arrangement for LWD applications, the system 1300 may be also realized for one of the two applications.

A method 1 can comprise: for each sensor of a set of sensors, generating a tool constant matrix by: conducting magnetic field measurements at four or more different azimuthal angles with respect to a direction to an excitation source from a tool using the sensor arranged on a surface of a tool, the excitation source having a current of a known value flowing in the excitation source, the tool separated from the excitation source at a known distance from center of the tool to center of the excitation source; generating, using a processor, the tool constant matrix for the sensor using the field measurements and a design matrix, the design matrix based on the known value of the current, the known distance, the four or more different azimuthal angles, and known orientation of the sensor; and storing the tool constant matrix in a storage device as a matrix of calibration coefficients for the sensor.

A method 2 can include elements of method 1 and can include forming a set of tool constant matrices for the respective sensor, each matrix of the set of tool constant matrices generated for a different sensor direction relative to the excitation source; and storing the set of tool constant matrices in a tool constant matrix library for the respective sensor.

A method 3 can include elements of any of methods 1 and 2 and can include forming the set of tool constant matrices for the respective sensor for the different sensor directions relative to the excitation source to include forming the set of tool constant matrices at a plurality of different azimuthal angles in the range from 0° to 360°.

A method 4 can include elements of any of methods 1, 2, and 3 and can include the sensors oriented in a tangential direction or in a normal direction at the different azimuthal angles.

A method 5 can comprise: conducting magnetic field measurements at different azimuth angles, using a set of sensors of a tool at a selected tool azimuth angle, in response to current flowing in a conductive structure, the tool and the structure disposed below earth surface; and processing values of the magnetic field measurements, using a processor, to generate a ranging distance from the tool to the conductive structure, the processing including: generating an inverse of a tool constant matrix for the selected tool azimuthal angle, the tool constant matrix being a matrix of calibration coefficients for each sensor of the set; generating a design matrix from a multiplication of a matrix of values from the magnetic field measurements and the inverse of the tool constant matrix; and generating the ranging distance using two elements of the design matrix to calculate a total magnetic field and two elements of the design matrix to calculate a gradient magnetic field.

A method 6 can include elements of method 5 and can include selecting the tool constant matrix by: prior to generating the ranging distance, selecting a first tool constant matrix from a tool constant library; calculating direction to the conductive structure using an application of the selected first tool constant matrix to the magnetic field measurements; and selecting the tool constant matrix from the tool constant library based on the calculated direction.

A method 7 can include elements of any of methods 5 and 6 and can include using the set of sensors to include using at least 2 sensors with measurements in one stationary position of the tool, or using one sensor at least two azimuthal measurements due to a rotation operation of the tool.

A method 8 can include elements of any of methods 5-7 and can include using only sensors oriented normally to a center of the tool or only sensors oriented tangentially to the center of the tool.

A method 9 can include elements of any of methods 5-8 and can include generating a ranging direction using a ratio of the two elements of the design matrix used to calculate the total magnetic field.

A machine-readable storage device 1 can have instructions stored thereon, which, when performed by a machine, cause the machine to perform operations, the operations comprising: for each sensor of a set of sensors, generating a tool constant matrix by: conducting magnetic field measurements at four or more different azimuthal angles with respect to a direction to an excitation source from a tool using the sensor arranged on a surface of a tool, the excitation source having a current of a known value flowing in the excitation source, the tool separated from the excitation source at a known distance from center of the tool to center of the excitation source; generating, using a processor, the tool constant matrix for the sensor using the field measurements and a design matrix, the design matrix based on the known value of the current, the known distance, the four or more different azimuthal angles, and known orientation of the sensor; and storing the tool constant matrix in a storage device as a matrix of calibration coefficients for the sensor.

A machine-readable storage device 2 can include elements of machine-readable storage device 1 and can include the operations to include: forming a set of tool constant matrices for the respective sensor, each matrix of the set of tool constant matrices generated for a different sensor direction relative to the excitation source; and storing the set of tool constant matrices in a tool constant matrix library for the respective sensor.

A machine-readable storage device 3 can include elements of any of machine-readable storage devices 1 and 2 and can include forming the set of tool constant matrices for the respective sensor for the different sensor directions relative to the excitation source to include forming the set of tool constant matrices at a plurality of different azimuthal angles in the range from 0° to 360°.

A machine-readable storage device 4 can include elements of any of machine-readable storage devices 1-3 and can include the sensors oriented in a tangential direction or in a normal direction at the different azimuthal angles.

A machine-readable storage device 5 can have instructions stored thereon, which, when performed by a machine, cause the machine to perform operations, the operations comprising: conducting magnetic field measurements at different azimuth angles, using a set of sensors of a tool at a selected tool azimuth angle, in response to current flowing in a conductive structure, the tool and the conductive structure disposed below earth surface; and processing values of the magnetic field measurements, using a processor, to generate a ranging distance from the tool to the conductive structure, the processing including: generating an inverse of a tool constant matrix for the selected tool azimuthal angle, the tool constant matrix being a matrix of calibration coefficients for each sensor of the set; generating a design matrix from a multiplication of a matrix of values from the magnetic field measurements and the inverse of the tool constant matrix; and generating the ranging distance using two elements of the design matrix to calculate a total magnetic field and two elements of the design matrix to calculate a gradient magnetic field.

A machine-readable storage device 6 can include elements of machine-readable storage device 5 and can include the operations to include selecting the tool constant matrix by: prior to generating the ranging distance, selecting a first tool constant matrix from a tool constant library; calculating direction to the conductive structure using an application of the selected first tool constant matrix to the magnetic field measurements; and selecting the tool constant matrix from the tool constant library based on the calculated direction.

A machine-readable storage device 7 can include elements of any of machine-readable storage devices 5 and 6 and can include using the set of sensors to include using at least 2 sensors with measurements in a stationary position of the tool, or using one sensor at least two azimuthal measurements due to a rotation operation of the tool.

A machine-readable storage device 8 can include elements of any of machine-readable storage devices 5-7 and can include operations using only sensors oriented normally to a center of the tool or only sensors oriented tangentially to the center of the tool.

A machine-readable storage device 9 can include elements of any of machine-readable storage devices 5-8 and can include operations generating a ranging direction using a ratio of the two elements of the design matrix used to calculate the total magnetic field.

A system 1 can comprise: a current generator coupled to a excitation source to provide current to the excitation source, the current having a known value; and a processor arranged, for each sensor of a set of sensors disposed on a surface of a tool, to: receive values of magnetic field measurements from measurements at four or more different azimuthal angles with respect to a direction to the excitation source from the tool using the sensor, the tool separated from the excitation source at a known distance from center of the tool to center of the excitation source; generate a tool constant matrix for the sensor using the field measurements and a design matrix, the design matrix based on the known value of the current, the known distance, the four or more different azimuthal angles, and known orientation of the sensor; and store the tool constant matrix in a storage device as a matrix of calibration coefficients for the sensor.

A system 2 can include elements of system 1 and can include the processor arranged to: form a set of tool constant matrices for the respective sensor, each matrix of the set of tool constant matrices generated for a different sensor direction relative to the excitation source; and store the set of tool constant matrices in a tool constant matrix library for the respective sensor.

A system 3 can include elements of any of systems 1 and 2 and can include the set of tool constant matrices for the respective sensor to include tool constant matrices at a plurality of different azimuthal angles in the range from 0° to 360°.

A system 4 can include elements of any of systems 1-3 and can include the respective sensors oriented in a tangential direction or in a normal direction at the different azimuthal angles.

A system 5 can comprise: a tool having a set of sensors disposed on a surface of the tool, the set of sensors structured to sense a magnetic field to provide values of magnetic field measurements, in response to current flowing in a conductive structure, at a selected tool azimuth angle, the sensors of the set arranged on the surface of the tool at different azimuthal angles; and a processor arranged, for each sensor of the set of sensors, to process the values of the magnetic field measurements to generate a ranging distance from the tool to the conductive structure, the process including: generation of an inverse of a tool constant matrix for the selected tool azimuthal angle, the tool constant matrix being a matrix of calibration coefficients for each sensor of the set; generation of a design matrix from a multiplication of a matrix of the values from the magnetic field measurements and the inverse of the tool constant matrix; and generation of the ranging distance by use of two elements of the design matrix to calculate a total magnetic field and two elements of the design matrix to calculate a gradient magnetic field.

A system 6 can include elements of system 5 and can include the processor arranged to select the tool constant matrix by operations to: prior to generation of the ranging distance, select a first tool constant matrix from a tool constant library; calculate direction to the conductive structure using an application of the selected first tool constant matrix to the magnetic field measurements; and select the tool constant matrix from the tool constant library based on the calculated direction.

A system 7 can include elements of any of systems 5 and 6 and can include the set of sensors to include at least 2 sensors to conduct measurements in one stationary position of the tool or one sensor to conduct measurements at two or more azimuthal measurements corresponding to a rotation operation of the tool.

A system 8 can include elements of any of system 5-7 and can include the sensors arranged only oriented normally with respect to a center of the tool or only oriented tangentially with respect to the center of the tool.

A system 9 can include elements of any of system 5-8 and can include the processor arranged to generate a ranging direction by use of a ratio of the two elements of the design matrix used to calculate the total magnetic field.

In various embodiments, calibration techniques as taught herein can improve calibration processing relative to conventional calibration methods such that the calibration techniques can be achieved based on any individual component measurement of the gradient tool. Consequently, the calibration and ranging distance determination can be performed using only normal component, only tangential component, or any combination of all available measurements of a gradient tool as long as the used measurements are sensitive enough to the target well signal. Systems and techniques, as taught herein, may be useful for magnetic ranging tool calibration and accurate ranging distance determination. These techniques can be applied to any combinations of sensors used in magnetic ranging distance calculation. The calibration techniques can be applied to existing gradient tools to determine accurate ranging distance compared to a reference tool. In various embodiments, such techniques and systems, as taught herein, may be implemented with only surface excitation without access to the target well, which can speed up the operation time and reduce cost in SAGD applications.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   determining a set of calibration coefficients for each sensor of a plurality of sensors of a ranging tool, wherein each one of the sensors is configured as a single component sensor, and wherein for each one of the individual sensors of the plurality of sensors the method further comprising:
conducting magnetic field measurements, using the individual sensor, at four or more different azimuthal angles of the individual sensor with respect to a rotational position of the ranging tool relative to a line extending to a center of an excitation source from a center of the ranging tool, the excitation source having a current of a known value flowing in the excitation source, the ranging tool separated from the excitation source at a known distance from a center of the ranging tool to a center of the excitation source;
selecting four of the magnetic field measurements corresponding to four azimuthal angles of the four or more different azimuthal angles of the individual sensor;
generating, using a processor, the set of calibration coefficients for a tool constant matrix for the individual sensor using values determined for the four selected magnetic field measurements and a design matrix, wherein the design matrix is based on the known value of the current, the known distance from the center of the ranging tool to the center of the excitation source, the four azimuthal angles of the four or more different azimuthal angles, and a known orientation of the individual sensor; and
storing, using a storage device, the set of calibration coefficients of the tool constant matrix for the individual sensor in a tool constant matrix library; and
determining a ranging distance comprising:
conducting second magnetic field measurements at a selected tool azimuth angle, using the plurality of sensors, in response to current flowing in a conductive structure, the ranging tool and the conductive structure disposed below a surface of earth;
creating a second tool constant matrix using the set of calibration coefficients for each one of the individual sensors of the plurality of sensors from the tool constant matrix library; and
processing values of the second magnetic field measurements, using the processor, to generate the ranging distance from the ranging tool to the conductive structure, the processing including:
generating an inverse of the second tool constant matrix for the selected tool azimuthal angle;
generating a second design matrix from a multiplication of a matrix of values from the second magnetic field measurements and the inverse of the second tool constant matrix; and
generating the ranging distance based on a calculated value for a total magnetic field and a calculated value for a gradient magnetic field, including using a first set of two elements of the second design matrix to calculate the total magnetic field and using a second set of two elements of the second design matrix to calculate the gradient magnetic field.

2. The method of claim 1, further comprising
forming a set of tool constant matrices for each one of the individual sensors, each matrix of the set of tool constant matrices generated for a different tool face angle of the respective individual sensor relative to the excitation source,
wherein conducting the magnetic field measurements at the four or more different azimuthal angles comprises conducting magnetic field measurements at a plurality of different azimuthal angles in a range from 0° to 360°, and
wherein forming the set of tool constant matrices for each one of the individual sensors for the different tool face angles relative to the excitation source includes forming the set of tool constant matrices at the plurality of different azimuthal angles; and
storing coefficients of the set of tool constant matrices in the tool constant matrix library for each one of the individual sensors.

3. The method of claim 1, wherein the plurality of sensors are configured to sense in either a tangential direction or in a normal direction at the different azimuthal angles.

4. The method of claim 1, further comprising:
prior to generating the ranging distance, selecting a third tool constant matrix from the tool constant matrix library;
calculating a direction to the conductive structure using an application of the third tool constant matrix to the second magnetic field measurements; and
selecting a second set of calibration coefficients for the second tool constant matrix based on the calculated direction.

5. The method of claim 1,
wherein using the plurality of sensors includes:
using at least two sensors with measurements in one stationary position of the ranging tool, or
using at least two azimuthal measurements taken with one sensor of the plurality of sensors due to a rotation operation of the ranging tool.

6. The method of claim 1, further comprising generating a ranging direction using a ratio of the first set of two elements of the second design matrix used to calculate the total magnetic field.

7. A machine-readable storage device having instructions stored thereon, which, when performed by a machine, cause the machine to perform operations, the operations comprising:
determining a set of calibration coefficients for each sensor of a plurality of sensors of a ranging tool, wherein each one of the sensors is configured as a single component sensor, and wherein for each one of the individual sensors of the plurality of sensors the operations further comprise:
conducting magnetic field measurements, using the individual sensor, at four or more different azimuthal angles of the individual sensor with respect to a rotational position of the ranging tool relative to a line extending to a center of an excitation source from a center of the ranging tool, the excitation source having a current of a known value flowing in the excitation source, the ranging tool separated from the excitation source at a known distance from a center of the ranging tool to a center of the excitation source;
selecting four of the magnetic field measurements corresponding to four azimuthal angles of the four or more different azimuthal angles of the individual sensor;
generating, using a processor, the set of calibration coefficients for a tool constant matrix for the individual sensor using values determined for the four selected magnetic field measurements and a design matrix, wherein the design matrix is based on the known value of the current, the known distance from the center of the ranging tool to the center of the excitation source, the four azimuthal angles of the four or more different azimuthal angles, and a known orientation of the individual sensor; and storing, using a storage device, the set of calibration coefficients of the tool constant matrix for the individual sensor in a tool constant matrix library; and determining a ranging distance comprising:

conducting second magnetic field measurements at a selected tool azimuth angle, using the plurality of sensors, in response to current flowing in a conductive structure, the ranging tool and the conductive structure disposed below a surface of earth;

creating a second tool constant matrix using the set of calibration coefficients for each one of the individual sensors of the plurality of sensors from the tool constant matrix library; and processing values of the second magnetic field measurements, using the processor, to generate the ranging distance from the ranging tool to the conductive structure, the processing including:

generating an inverse of the second tool constant matrix for the selected tool azimuthal angle;

generating a second design matrix from a multiplication of a matrix of values from the second magnetic field measurements and the inverse of the second tool constant matrix; and generating the ranging distance based on a calculated value for a total magnetic field and a calculated value for a gradient magnetic field, including using a first set of two elements of the second design matrix to calculate the total magnetic field and using a second set of two elements of the second design matrix to calculate the gradient magnetic field.

8. The machine-readable storage device of claim 7, wherein the operations further comprise:

forming a set of tool constant matrices for each one of the individual sensors of the one or more sensors, each matrix of the set of tool constant matrices generated for a different tool face angle of the respective individual sensor relative to the excitation source, wherein conducting the magnetic field measurements at the four or more different azimuthal angles comprises conducting magnetic field measurements at a plurality of different azimuthal angles in the range from 0° to 360°, and wherein forming the set of tool constant matrices for each one of the individual sensors for the different tool face angles relative to the excitation source includes forming the set of tool constant matrices at the plurality of different azimuthal angles; and storing coefficients of the set of tool constant matrices in the tool constant matrix library for each one of the individual sensors.

9. The machine-readable storage device of claim 7, wherein the plurality of sensors are configured to sense in either a tangential direction or in a normal direction at the different azimuthal angles.

10. The machine-readable storage device of claim 7, wherein the operations further comprise:

prior to generating the ranging distance, selecting a third tool constant matrix from the tool constant matrix library;

calculating a ranging direction to the conductive structure using an application of the selected third tool constant matrix to the second magnetic field measurements; and selecting a second set of calibration coefficients for the second tool constant matrix from the tool constant library based on the calculated ranging direction.

11. The machine-readable storage device of claim 7, wherein using the plurality of sensors incudes:

using at least two sensors with measurements in a stationary position of the ranging tool, or using at least two azimuthal measurements taken with one sensor of the plurality of sensors due to a rotation operation of the ranging tool.

12. The machine-readable storage device of claim 7, wherein the operations comprise generating a ranging direction using a ratio of the first set of two elements of the second design matrix used to calculate the total magnetic field.

13. A system comprising:

a current generator coupled to an excitation source to provide a current to the excitation source, the current having a known value;

a plurality of sensors disposed on a ranging tool; and a processor configured to determine a set of calibration coefficients for each one of the plurality of sensors, each one of the plurality of sensors configured as a single component sensor, wherein for each one of the individual sensors of the plurality of sensors the processor is configured to:

conduct magnetic field measurements, using the individual sensor, at four or more different azimuthal angles of the individual sensor with respect to a rotational position of the ranging tool relative to a line extending to a center of the excitation source from a center of the ranging tool, the ranging tool separated from the excitation source at a known distance from the center of the ranging tool to the center of the excitation source;

select four of the magnetic field measurements corresponding to four azimuthal angles of the four or more different azimuthal angles of the individual sensor;

generate the set of calibration coefficients for a tool constant matrix for the individual sensor using values determined for the four selected magnetic field measurements and a design matrix, wherein the design matrix is based on the known value of the current, the known distance from the center of the ranging tool to the center of the excitation source, the four azimuthal_angles of the four or more different azimuthal angles, and a known orientation of the individual sensor; and store, using a storage device, the set of calibration coefficients of the tool constant matrix for the individual sensor in a tool constant matrix library;

wherein the processor is arranged, for each of the plurality of sensors, to generate a ranging distance from the ranging tool to a conductive structure, including the processor arranged to:

receive values of second magnetic field measurements of the plurality of sensors for a selected tool azimuth angle in response to current flowing in the conductive structure, the ranging tool and the conductive structure disposed below a surface of the earth;

create a second tool constant matrix using the set of calibration coefficients for each one of the individual sensors of the plurality of sensors from the tool constant matrix library;

generate an inverse of the second tool constant matrix for the selected tool azimuthal angle;

generate a second design matrix from a multiplication of a matrix of the values from the second magnetic field measurements and the inverse of the tool constant matrix; and generate the ranging distance based on a calculated value for a total magnetic field and a calculated value for a gradient magnetic field, including by use of a first set of two elements of the second design matrix to calculate the total magnetic field and use of a second set of two elements of the second design matrix to calculate the gradient magnetic field.

14. The system of claim 13, wherein the processor is arranged to:

form a set of tool constant matrices for each one of the individual sensors, each matrix of the set of tool constant matrices generated for a different tool face angle of the respective individual sensor relative to the excitation source, wherein receiving values of the magnetic field measurements at the four or more different azimuthal angles comprises receiving values of magnetic field measurements at a plurality of different azimuthal angles in the range from 0° to 360°, and wherein forming the set of tool constant matrices for each one of the individual sensors for the different tool face angles relative to the excitation source includes tool constant matrices at the plurality of different azimuthal angles; and store coefficients of the set of tool constant matrices in the tool constant matrix library for each one of the individual sensors.

15. The system of claim 13, wherein the plurality of sensors are configured to sense in either a tangential direction or in a normal direction at the different azimuthal angles.

16. The system of claim 13, wherein the processor is arranged to:

prior to generation of the ranging distance, select a third tool constant matrix from the tool constant matrix library;

calculate a ranging direction to the conductive structure using an application of the selected third tool constant matrix to the second magnetic field measurements; and select a second set of calibration coefficients for the second tool constant matrix from the tool constant library based on the calculated ranging direction.

17. The system of claim 13, wherein the plurality of sensors includes at least two sensors to conduct measurements in one stationary position of the ranging tool or one sensor of the plurality of sensors to conduct measurements at two or more azimuthal measurements corresponding to a rotation operation of the ranging tool, wherein the plurality of sensors are arranged only oriented normally with respect to a center of the ranging tool or only oriented tangentially with respect to the center of the ranging tool, and wherein the processor is arranged to generate a ranging direction by use of a ratio of the two elements of the second design matrix used to calculate the total magnetic field.

* * * * *